(12) United States Patent
Tatsuno

(10) Patent No.: US 8,837,027 B2
(45) Date of Patent: Sep. 16, 2014

(54) OPTICAL SCANNING DEVICE AND IMAGE FORMING APPARATUS

(71) Applicant: Hibiki Tatsuno, Kanagawa (JP)

(72) Inventor: Hibiki Tatsuno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/177,860

(22) Filed: Feb. 11, 2014

(65) Prior Publication Data

US 2014/0160545 A1 Jun. 12, 2014

Related U.S. Application Data

(62) Division of application No. 12/960,834, filed on Dec. 6, 2010, now Pat. No. 8,699,110.

(30) Foreign Application Priority Data

Dec. 10, 2009 (JP) ................................. 2009-280233

(51) Int. Cl.
  *G02B 26/08* (2006.01)
  *G02B 26/12* (2006.01)
(52) U.S. Cl.
  CPC ............ *G02B 26/127* (2013.01); *G02B 26/125* (2013.01)
  USPC ...................... 359/204.1; 359/204.2; 347/243
(58) Field of Classification Search
  CPC .. H02B 26/123; H02B 26/127; H04N 1/1135; B41J 2/47; B41J 2/473
  USPC .................... 359/204.1–204.5; 347/233–236, 347/243–244, 246
  See application file for complete search history.

(56) References Cited

U.S. PATENT DOCUMENTS

| | | | |
|---|---|---|---|
| 6,924,938 B2 | 8/2005 | Nishina et al. | |
| 7,274,499 B2 | 9/2007 | Kato | |
| 8,228,583 B2 | 7/2012 | Amada et al. | |
| 8,441,512 B2 | 5/2013 | Tatsuno et al. | |
| 2006/0209373 A1 | 9/2006 | Kato | |
| 2007/0132829 A1 | 6/2007 | Ishihara | |

(Continued)

FOREIGN PATENT DOCUMENTS

| | | |
|---|---|---|
| JP | 10-100476 | 4/1998 |
| JP | 10-329357 | 12/1998 |

(Continued)

OTHER PUBLICATIONS

Office Action mailed Dec. 12, 2013, in Japanese Patent Application No. 2009-280233.

*Primary Examiner* — James Phan
(74) *Attorney, Agent, or Firm* — Oblon, Spivak, McClelland, Maier & Neustadt, L.L.P.

(57) ABSTRACT

An optical scanning device includes: a light source including a plurality of light-emitting elements; a deflector that defects light beams output from the light source; a scanning optical system that condenses the light beams deflected on the deflector onto a surface to be scanned, and includes at least one resin scanning lens and at least one folding mirror disposed behind the at least one resin scanning lens; a light-receiving element to which part of the light beams, which is deflected on the deflector but not used for scanning the surface, enters not via the at least one folding mirror as light-amount monitoring light beams; and a controller that controls a driving signal for the light-emitting elements based on an output signal from the light-receiving element.

10 Claims, 24 Drawing Sheets

(56) References Cited

U.S. PATENT DOCUMENTS

| | | |
|---|---|---|
| 2007/0253047 A1 | 11/2007 | Ichii et al. |
| 2009/0074437 A1* | 3/2009 | Tanabe et al. .................. 399/51 |
| 2009/0225383 A1 | 9/2009 | Soeda et al. |
| 2009/0314927 A1 | 12/2009 | Tatsuno et al. |
| 2010/0091342 A1 | 4/2010 | Nakamura |
| 2010/0124434 A1 | 5/2010 | Tatsuno |
| 2010/0195681 A1 | 8/2010 | Tatsuno et al. |

FOREIGN PATENT DOCUMENTS

| | | |
|---|---|---|
| JP | 2002-26445 | 1/2002 |
| JP | 2002-182146 | 6/2002 |
| JP | 2005-274678 | 10/2005 |
| JP | 2007-298563 | 11/2007 |
| JP | 2008-224943 | 9/2008 |
| JP | 2009-145398 | 7/2009 |

* cited by examiner

FIG.30A
SCANNING LENS
MAIN SCANNING DIRECTION
FIG.30B
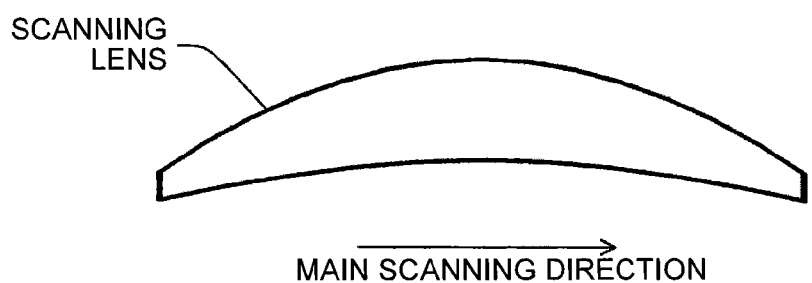
MAIN AXIS
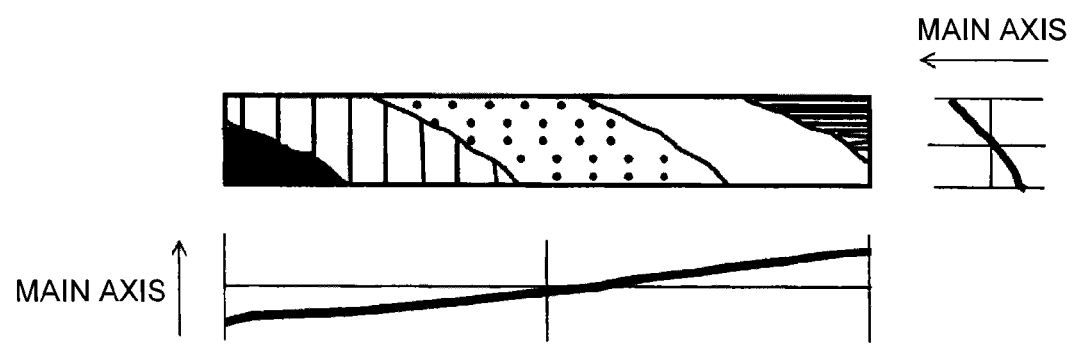
MAIN AXIS
FIG.30C
PHASE DIFFERENCE
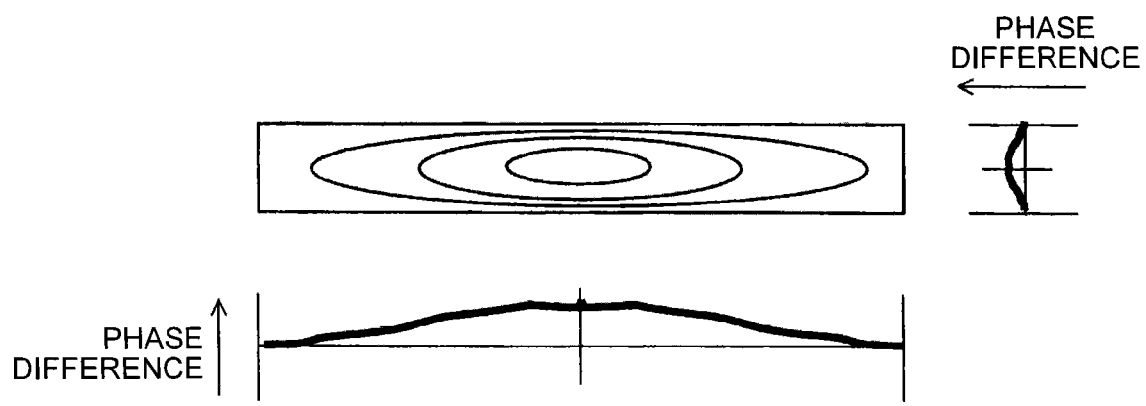
PHASE DIFFERENCE

BEFORE APC
AMOUNT OF LIGHT BEFORE BEING INCIDENT ON FOLDING MIRROR ch1:100
ch2:100

AMOUNT OF LIGHT ON SURFACE TO BE SCANNED
ch1:10
ch2:8

AMOUNT OF LIGHT ON PHOTODIODE
ch1:7
ch2:10

AFTER APC
AMOUNT OF LIGHT BEFORE BEING INCIDENT ON FOLDING MIRROR ch1:100
ch2:70

AMOUNT OF LIGHT ON SURFACE TO BE SCANNED
ch1:10
ch2:5.6

AMOUNT OF LIGHT ON PHOTODIODE
ch1:7
ch2:7

OPTICAL SCANNING DEVICE AND IMAGE FORMING APPARATUS

CROSS-REFERENCE TO RELATED APPLICATIONS

This application is a divisional of U.S. application Ser. No. 12/960,834, filed Dec. 6, 2010, now U.S. Pat. No. 8,699,110, and is based upon and claims the benefit of priority from prior Japanese Patent Application No. 2009-280233, filed Dec. 10, 2009, the entire contents of both of which are incorporated herein by reference.

BACKGROUND OF THE INVENTION

1. Field of the Invention

The present invention relates to an optical scanning device and an image forming apparatus, and more particularly to an optical scanning device that scans a surface to be scanned with a light beam and to an image forming apparatus including the optical scanning device.

2. Description of the Related Art

In a digital copier, a laser printer, a laser facsimile, and the like, an image is written using an optical scanning device. Such an optical scanning device includes a light source having a light-emitting element, a first optical system that forms an image of a light beam output from the light source as a long linear image extending in a main-scanning direction, a deflector having a deflection reflecting surface disposed near a position where the linear image is formed to deflect a light beam output from the first optical system, and a second optical system that condenses a light beam deflected by the deflector to a spot of light on a surface to be scanned, and scans the surface with light beams. Also well known is a so-called multi-beam optical scanning device in which a surface to be scanned is scanned with a plurality of light beams by using a multi-beam light source having a plurality of light-emitting elements.

When a plurality (n) of light beams is used for scanning, the time required for forming an image is reduced to 1/n compared with a configuration using only one light beam, and thus, the multi-beam device contributes to an increase in speed of image formation. However, when the light intensities of the light beams are different, the concentration becomes uneven in each scanning line, resulting in lower image quality.

Therefore, an optical scanning device typically includes a detector, such as a photodiode, that detects part of the light beams output from the light source as monitoring light beams; and auto power control (APC) that controls the output level of the light source is performed based on the detection result.

An edge emitting laser diode (LD) that is a common semiconductor laser has a resonator that uses both edges of a crystal, formed on a substrate as reflecting surfaces. Front edge light is output from the front edge of the resonator, while rear edge light is output from the rear edge of the resonator.

A photodiode (PD) for receiving the rear edge light is typically incorporated in a given package with the edge emitting LD, and the amount of light output is controlled by feeding back the amount of light received by the PD.

On the contrary, a vertical cavity surface emitting laser (VCSEL) outputs light only in one direction. Therefore, unlike the edge emitting LD, the amount of light output cannot be monitored using the rear edge light. To address this issue, according to the inventions disclosed in Japanese Patent Application Laid-open No. H10-100476, Japanese Patent Application Laid-open No. 2002-26445, Japanese Patent Application Laid-open No. 2005-274678, and Japanese Patent Application Laid-open No. 2007-298563, for example, a light beam output from a VCSEL is split into a light beam for writing and a light beam for monitoring the amount of light.

However, the light amount control methods disclosed in Japanese Patent Application Laid-open No. H10-100476, Japanese Patent Application Laid-open No. 2002-26445, Japanese Patent Application Laid-open No. 2005-274678, and Japanese Patent Application Laid-open No. 2007-298563 may fail to obtain a sufficient amount of light for scanning a surface to be scanned. Therefore, Japanese Patent Application Laid-open No. 2009-145398 suggests using light beams that scan outside of a valid scanning area on the surface for controlling the amount of light.

An increasing number of molded plastic products has come to be used as optical elements in an optical scanning device, especially as a lens used in the second optical system (as a scanning lens) because the molded plastic products are economical and a free form curvature surface can be achieved relatively easily. Molded plastic scanning lenses are also widely adopted in multi-beam optical scanning devices in the same manner as in conventional optical scanning devices having a single-beam light source.

During a plastic molding process of an optical element, birefringence appears in lenses depending on their materials, production conditions, forms, and other factors. Birefringence is a phenomenon where the refractive index of a lens differs for each orthogonal light ray, and is expressed by a main axis orientation and a phase difference. The main axis orientation herein means the same as a fast axis orientation or a slow axis orientation.

Many scanning lenses are larger in size than pickup lenses (objective lenses) used in an optical disk apparatus, and some molded plastic scanning lenses have an uneven birefringence distribution inside the lenses. In particular, when the difference in thickness between the center and the peripheral of a lens is large, that is, when the thickness difference is larger, birefringence distribution will become more uneven.

For example, it is assumed herein that, as illustrated in FIG. 31, two light beams (a beam 1 and a beam 2), which are output from different light-emitting elements (ch1 and ch2) and kept separated from each other in the sub-scanning direction, pass through a scanning lens having a birefringence distribution illustrated in FIGS. 30A to 30C. In such an example, the birefringence of the scanning lens affects the beam 1 and the beam 2 differently. Therefore, as in an example illustrated in FIG. 32, the beam 1 and the beam 2, both of which are polarized linearly before being incident into the scanning lens, become polarized in different ways after passing through the scanning lens. In FIG. 32, the beam 1 is elliptically polarized in a vertically elongated manner, and the beam 2 is elliptically polarized in a horizontally elongated manner. If a folding mirror is disposed between the scanning lens and the surface to be scanned, for example, because the reflectance of the beam 1 and that of the beam 2 differ on the folding mirror, the amounts of light on the surface to be scanned also differ between ch1 and ch2. If the amounts of light on the surface to be scanned differ between the light-emitting elements, the concentration in an output image might become uneven, and especially, banding might occur.

The reason why the polarizations of ch1 and ch2 differ before and after passing through the scanning lens is that the scanning lens has an uneven birefringence distribution in the sub-scanning direction. Further, because the scanning lens also has an uneven birefringence distribution in the main-scanning direction, the uneven birefringence distribution in the sub-scanning direction differs depending on positions in the main-scanning direction. In other words, a difference in the amounts of light between ch1 and ch2 on the surface to be scanned differs from a difference in the amounts of light between ch1 and ch2 on the PD.

Therefore, the difference in the amounts of light between ch1 and ch2 on the surface to be scanned cannot be eliminated simply by controlling the amounts of light output from ch1 and ch2 based on the difference in the amounts of light on the PD. Such control could even increase the difference. In other words, in the conventional light amount controlling system, light beams are affected by birefringence twice.

The fact that light beams are affected by birefringence twice will now be explained. As illustrated in FIG. 33A, for example, it is assumed herein that the amounts of light output from ch1 and ch2 and being incident on a folding mirror are in a ratio of 100:100. Because the polarizations differ for ch1 and ch2 as illustrated in FIG. 32, the reflectance of the light beam 1 and that of the light beam 2 on the folding mirror also differ. Therefore, the amounts of light on the surface to be scanned would differ between ch1 and ch2, for example, in a ratio of 10 (ten percent reflectance):8 (eight percent reflectance). This is a conventional issue that is shared between an optical scanning device using an edge emitting LD and an optical scanning device using a VCSEL and including a monitoring PD disposed near a light source. However, if the amounts of light are monitored using the method disclosed in Japanese Patent Application Laid-open No. 2009-145398, this issue could become more severe.

Under such circumstances, because the birefringence distribution of the scanning lens differs depending on positions in the main-scanning direction, the polarizations of the scanning light beams travelling toward the PD also differ from the polarizations of writing light beams travelling toward the photosensitive element, and the amounts of light on the PD could be, for example, in a ratio of 7 (seven percent reflectance):10 (ten percent reflectance) between ch1 and ch2. At this time, if the amount of light output from ch2 is reduced in response to the amounts of light received by the PD and fed back to the light-emitting elements in an attempt to make the amounts of light on the PD even, the amounts of light on the PD would be in a ratio of 7:7 between ch1 and ch2 as illustrated in FIG. 33B, which means the amounts of light received by the both become even. However, the amounts of light on the photosensitive element would be in a ratio of 10:5.6 between ch1 and ch2, which means the difference between the amounts of light is rather increased.

The amounts of light can basically be controlled more accurately by monitoring the amounts of light near the surface to be scanned than by monitoring the amounts of light near the VCSEL. However, if a scanning lens having an uneven birefringence distribution is used in the scanning optical system, the accuracy in the monitored amounts of light is reduced.

SUMMARY OF THE INVENTION

It is an object of the present invention to at least partially solve the problems in the conventional technology.

According to an aspect of the present invention, there is provided an optical scanning device including: a light source including a plurality of light-emitting elements; a deflector that defects light beams output from the light source; a scanning optical system that condenses the light beams deflected on the deflector onto a surface to be scanned, and includes at least one resin scanning lens and at least one folding mirror disposed behind the at least one resin scanning lens; a light-receiving element to which part of the light beams, which is deflected on the deflector but not used for scanning the surface, enters not via the at least one folding mirror as light-amount monitoring light beams; and a controller that controls a driving signal for the light-emitting elements based on an output signal from the light-receiving element.

According to another aspect of the present invention, there is provided an optical scanning device including: a light source including a plurality of light-emitting elements; a deflector that defects light beams output from the light source; a scanning optical system that condenses the light beams deflected on the deflector onto a surface to be scanned, and includes at least one resin scanning lens having a support at an end thereof along a main-scanning direction, and at least one folding mirror disposed behind the at least one resin scanning lens; a light-receiving element to which part of the light beams, which is deflected on the deflector and passes through the support but not used for scanning the surface, enters via the at least one folding mirror as light-amount monitoring light beams; and a controller that controls a driving signal for the light-emitting elements based on an output signal from the light-receiving element.

According to still another aspect of the present invention, there is provided an image forming apparatus including: at least one image carrier; and at least one optical scanning device mentioned above that scans the at least one image carrier using light beams modulated based on image information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic for explaining how a plurality of light spots overlaps each other on a light receiving surface of a monitoring light receiver when all of light-emitting elements are turned on;

FIGS. 30A to 30C are schematics for explaining an example of uneven birefringence in a plastic molded scanning lens;

DETAILED DESCRIPTION OF THE PREFERRED EMBODIMENTS

Figure 1:
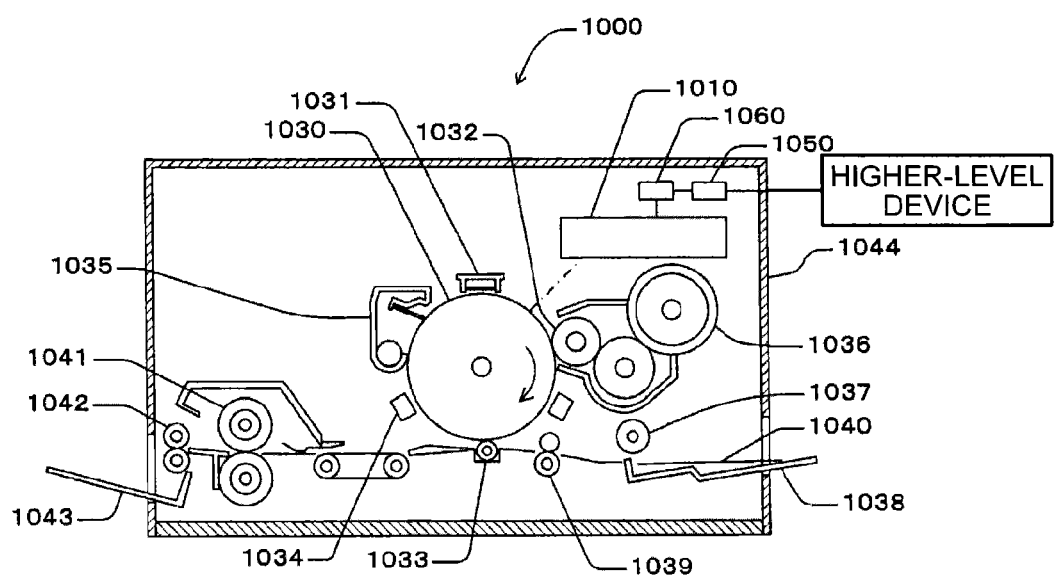
FIG. 1 is a schematic for explaining a general structure of a laser printer according to an embodiment of the present invention.

Exemplary embodiments according to the present invention are described below with reference to FIGS. 1 to 28. FIG. 1 is a schematic of a general structure of a laser printer 1000 as an image forming apparatus according to an embodiment of the present invention.

The laser printer 1000 includes an optical scanning device 1010, a photosensitive element 1030, an electric charger 1031, a developing roller 1032, a transfer charger 1033, a neutralizing unit 1034, a cleaning unit 1035, a toner cartridge 1036, a paper feeding roller 1037, a paper feed tray 1038, a registration roller pair 1039, a fixing rollers 1041, discharging rollers 1042, a discharge tray 1043, a communication control device 1050, and a printer control device 1060 that controls each of these units comprehensively. These units are housed in predetermined positions in a printer housing 1044.

The communication control device 1050 controls bi-directional communications with a higher-level device (e.g., a personal computer) over a network, for example.

The photosensitive element 1030 is a cylindrical member, and a photosensitive layer is formed on its surface. In other words, the surface of the photosensitive element 1030 is a surface to be scanned. The photosensitive element 1030 is rotated in the direction pointed by the arrow in FIG. 1.

The electric charger 1031, the developing roller 1032, the transfer charger 1033, the neutralizing unit 1034, and the cleaning unit 1035 are arranged near the surface of the photosensitive element 1030, and arranged sequentially in the order of the electric charger 1031, the developing roller 1032, the transfer charger 1033, the neutralizing unit 1034, and the cleaning unit 1035 in the rotating direction of the photosensitive element 1030.

The electric charger 1031 charges the surface of the photosensitive element 1030 uniformly.

The optical scanning device 1010 irradiates the surface of the photosensitive element 1030 charged by the electric charger 1031 with a light beam modulated based on image information received from the higher-level device. In this manner, a latent image corresponding to the image information is formed on the surface of the photosensitive element 1030. The latent image thus formed is transferred to the developing roller 1032 by rotation of the photosensitive element 1030. A structure of the optical scanning device 1010 will be explained later.

The toner cartridge 1036 stores therein toner, and the toner is supplied to the developing roller 1032.

The developing roller 1032 attaches the toner supplied from the toner cartridge 1036 to the latent image formed on the surface of the photosensitive element 1030 so as to visualize the image information. The latent image, to which the toner is attached (hereinafter, also referred to as "toner image" for convenience), is moved toward the transfer charger 1033 by rotation of the photosensitive element 1030.

Recording sheets 1040 are stored in the paper feed tray 1038. The paper feeding roller 1037 is disposed near the paper feed tray 1038 to take out the recording sheets 1040 one sheet at a time from the paper feed tray 1038, and to convey the recording sheet 1040 into the registration roller pair 1039. The registration roller pair 1039 temporarily holds the recording sheet 1040 taken out by the paper feeding roller 1037, carries and feeds the recording sheet 1040 into the space between the photosensitive element 1030 and the transfer charger 1033 in synchronization with rotation of the photosensitive element 1030.

A voltage having an opposite polarity to that of the toner is applied to the transfer charger 1033, so that the toner on the surface of the photosensitive element 1030 is electrically attracted to the recording sheet 1040. The toner image on the surface of the photosensitive element 1030 is transferred onto the recording sheet 1040 by this voltage. The recording sheet 1040 with the toner image transferred thereon is sent to the fixing rollers 1041.

The fixing rollers 1041 apply heat and pressure onto the recording sheet 1040. In this manner, the toner is fixed onto the recording sheet 1040. The recording sheet 1040 having the toner fixed thereon is sent to the discharge tray 1043 through the discharging rollers 1042, and stacked sequentially in the discharge tray 1043.

The neutralizing unit 1034 neutralizes the surface of the photosensitive element 1030.

The cleaning unit 1035 removes the toner remaining on the surface of the photosensitive element 1030 (residual toner).

The surface of the photosensitive element 1030 having the residual toner removed therefrom returns to a position facing the electric charger 1031.

Configurations of the optical scanning device 1010 will now be explained. Various configurations of the optical scanning device 1010 are possible.

First Exemplary Configuration

Figure 2:
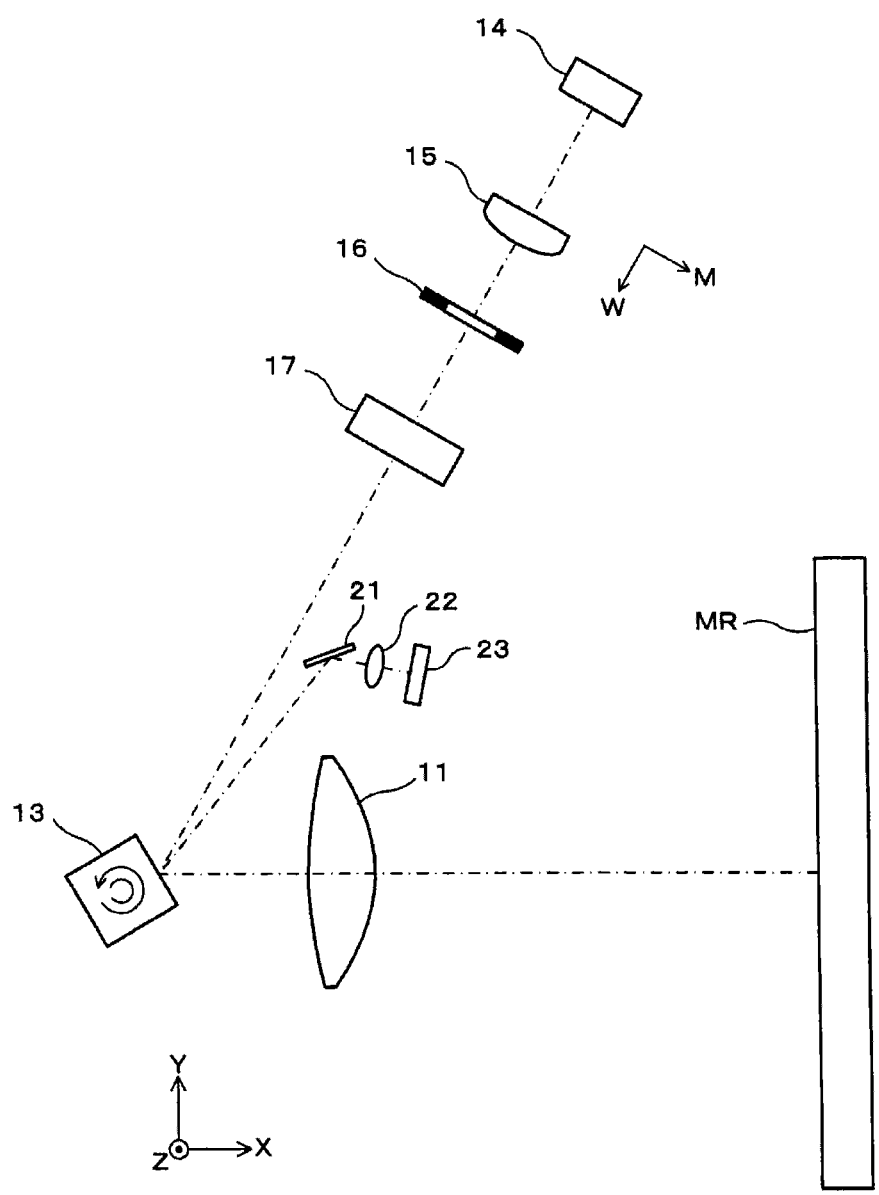
FIG. 2 is a schematic for explaining a first exemplary configuration of an optical scanning device.

According to a first exemplary configuration, as illustrated as an example in FIG. 2, the optical scanning device 1010 includes a scanning lens 11, a polygon mirror 13, a light source 14, a coupling lens 15, an aperture plate 16, a cylindrical lens 17, a reflecting mirror 21, a condensing lens 22, a monitoring light receiver 23, a folding mirror MR, and a scanning control device (not illustrated). These units are assembled in predetermined positions in an optical housing (not illustrated).

Hereinafter, the direction along the longitudinal direction of the photosensitive element 1030 is referred to as a Y-axis direction, and the direction along the optical axis of the scanning lens 11 is referred to as an X-axis direction in a three dimensional X-Y-Z Cartesian coordinate system. The direction along the optical axis of the coupling lens 15 is referred to as a "W direction". The direction perpendicular to both a Z-axis direction and the W direction is defined as an M direction.

Furthermore, also for a convenience, a direction corresponding to a main-scanning direction is simply referred to as a "main-scanning corresponding direction", and a direction corresponding to a sub-scanning direction is simply referred to as "sub-scanning corresponding direction".

Figure 3:
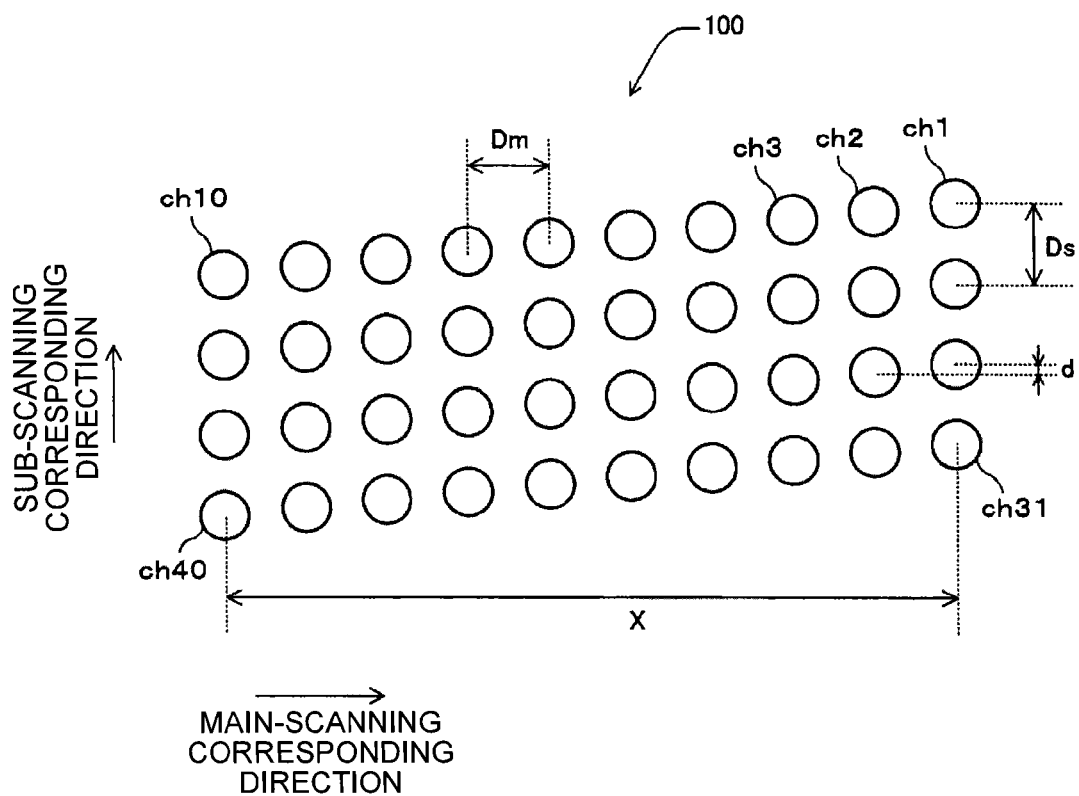
FIG. 3 is a schematic for explaining a surface emitting laser array included in a light source.
Figure 4:
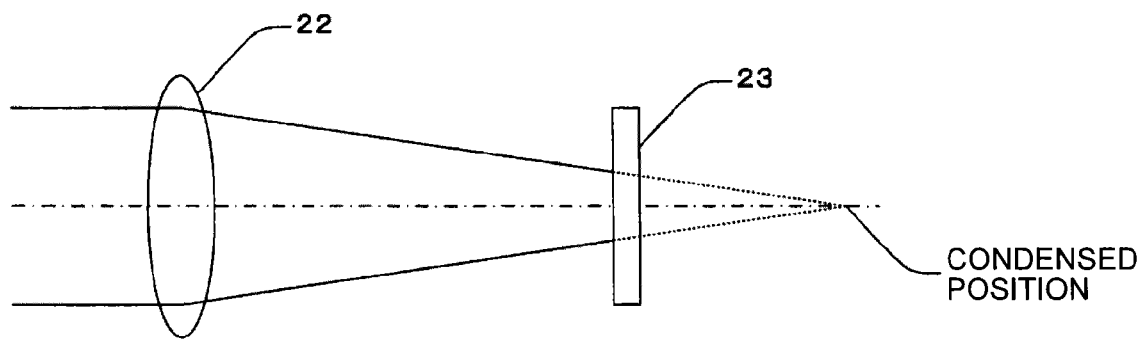
FIG. 4 is a schematic for explaining a position at which light-amount monitoring light beams are condensed.

As illustrated in FIG. 3 as an example, the light source 14 has a vertical cavity surface emitting laser array 100 on which a plurality of light-emitting elements are formed on a single substrate.

The surface emitting laser array 100 includes forty light-emitting elements (ch1 to ch40) arranged in a two dimensional array on a single substrate. The forty light-emitting elements are arranged so as to have an equally spaced light-emitting element pitch d which is denoted as when all of the light-emitting elements are orthographically projected onto a virtual line extending in the sub-scanning corresponding direction. A "light-emitting element pitch" used herein means the distance between the centers of two light-emitting elements.

In this example, d=2.5 micrometers. The light-emitting element pitch in the main-scanning corresponding direction is Dm=30 micrometers, and the light-emitting element pitch in the sub-scanning corresponding direction is Ds=25 micrometers. Therefore, the distance between the light-emitting elements that are furthest apart in the main-scanning corresponding direction is X=Dm×9=270 micrometers, and the distance between the light-emitting elements that are furthest apart in the sub-scanning corresponding direction is d×39=97.5 micrometers.

Each of the light-emitting elements has an oscillation wavelength in a 780-nanometer band. The light beam output from each of the light-emitting elements is linearly polarized.

The light source 14 includes a driving device for driving the light-emitting elements individually. In other words, the forty light beams can be used simultaneously to scan the photosensitive element 1030.

Referring back to FIG. 2, the coupling lens 15 is arranged on the optical path of the light beams output from the light source 14, thereby converting the light beams into bundles of approximate parallel rays.

The aperture plate 16 has an aperture to arrange the light beams that have travelled through the coupling lens 15.

The cylindrical lens 17 has a high power in the sub-scanning corresponding direction (that is the same as the Z-axis direction in this example), and forms images of the light beams that have travelled through the aperture of the aperture plate 16 with respect to the sub-scanning corresponding direction at a position near a deflection reflecting surface of the polygon mirror 13.

The optical system, disposed on the optical paths between the light source 14 and the polygon mirror 13, is also referred to as a pre-deflector optical system. In this embodiment, the pre-deflector optical system includes the coupling lens 15, the aperture plate 16, and the cylindrical lens 17.

The polygon mirror 13 is a four-faced mirror whose inscribed circle has a radius of 10 millimeters, and each of the faces acts as a deflection reflecting surface. The polygon mirror 13 is rotated about a shaft laid in parallel with the Z-axis direction at a constant speed, thereby deflecting the incident light beams from the cylindrical lens 17. The angle formed by the direction of the light beams incoming from the cylindrical lens 17 and the optical axis of the scanning lens 11 is 60 degrees on the X-Y plane.

The scanning lens 11 is a molded plastic scanning lens, and disposed on the optical paths of the light beams deflected on the polygon mirror 13.

The folding mirror MR is disposed on the optical paths of the light beams that have passed through the scanning lens 11 so as to guide the light beams onto the photosensitive element 1030.

The photosensitive element 1030 is irradiated with the light beams incoming from the cylindrical lens 17 and deflected on the polygon mirror 13 via the scanning lens 11 and the folding mirror MR, and a light spot is formed thereon. The light spot moves in the longitudinal direction of the photosensitive element 1030 as the polygon mirror 13 is rotated. In other words, the light spot scans the surface of the photosensitive element 1030. The direction in which the light spot moves corresponds to the "main-scanning direction" on the photosensitive element 1030, and the direction in which the photosensitive element 1030 is rotated corresponds to the "sub-scanning direction" on the photosensitive element 1030.

The optical system disposed on the optical paths between the polygon mirror 13 and the photosensitive element 1030 is referred to as a scanning optical system. In this embodiment, the scanning optical system includes the scanning lens 11 and the folding mirror MR.

The monitoring light receiver 23 has a light-receiving element that receives a part of the light beams deflected on the polygon mirror 13 but not used for scanning the photosensitive element 1030 and being incident without passing through the scanning lens 11, as light-amount monitoring light beams.

The reflecting mirror 21 reflects the light-amount monitoring light beams deflected by the polygon mirror 13 into a direction toward the monitoring light receiver 23.

The condensing lens 22 is disposed between the reflecting mirror 21 and the monitoring light receiver 23 so as to convert the light beams travelling toward the monitoring light receiver 23 into convergent light. In this explanation, as illustrated as an example in FIG. 4, the condensing lens 22 converts the light beams into convergent light that is condensed behind the light receiving surface of the monitoring light receiver 23. The condensing lens 22 may also convert the light beams to convergent light condensed in front of the light receiving surface of the monitoring light receiver 23.

Figure 5:
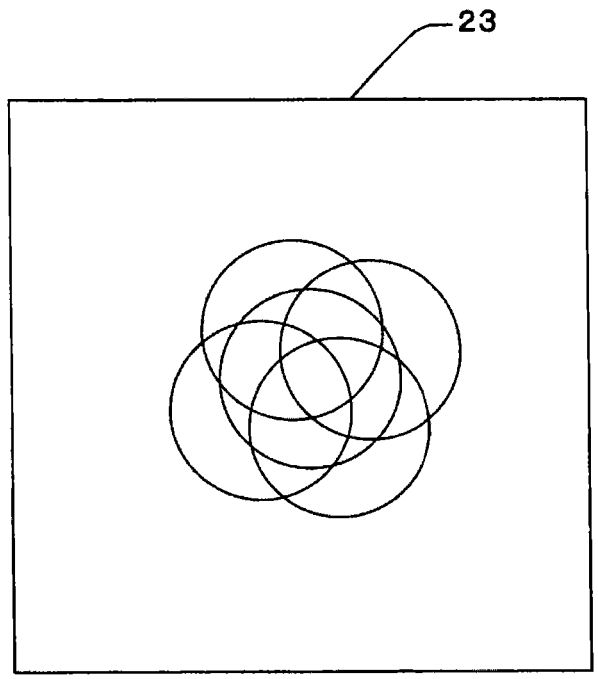

When all of the light-emitting elements are turned on simultaneously, a plurality of light spots on the light receiving surface of the monitoring light receiver 23 overlaps each other at least partially as illustrated as an example in FIG. 5. In such a situation, even if the light receiving surface has some fluctuations in light receiving sensitivity, the influence of such fluctuations can be ignored. Furthermore, even when some foreign substance is attached on the light receiving surface, its influence can be ignored as well.

Furthermore, the spot diameter of the light spot on the light receiving surface of the monitoring light receiver 23 is set larger than the spot diameter of the light spot on the surface of the photosensitive element 1030 both in the main-scanning corresponding direction and the sub-scanning corresponding direction.

The scanning optical system has a leading edge synchronization detecting sensor (not illustrated) on which the light beams before starting writing in a single scan are incident and a trailing edge synchronization detecting sensor (not illustrated) on which the light beams after completing writing in a single scan are incident in the manner disclosed in Japanese Patent Application Laid-open No. 2008-224943, for example. The leading edge and the trailing edge synchronization detecting sensors will be collectively referred to as "synchronization detecting sensors" as long as they do not need to be distinguished.

Each of the synchronization detecting sensors has a light-receiving element, and outputs an electrical signal corresponding to the amount of light received thereby to the scanning control device. An output signal of the leading edge synchronization detecting sensor is also referred to as a leading edge synchronization detection signal. An output signal of the trailing edge synchronization detecting sensor is also referred to as a trailing edge synchronization detection signal.

A difference between the monitoring light receiver 23 and the synchronization detecting sensors will now be explained.

A condensing lens for converging incident light beams in the main-scanning corresponding direction is often disposed before the synchronization detecting sensors. This is because the synchronization detecting sensors cannot accurately detect operational timing at which the light beams are incident on the synchronization detecting sensors if the light beams incident on the synchronization detecting sensors are diffused in the main-scanning corresponding direction. On the contrary, the light beams are often left diffused in the sub-scanning corresponding direction. This is because the light beams can reliably enter the synchronization detecting sensors as long as the light beams are linear in the sub-scanning corresponding direction even if the condensing lens is attached to the synchronization detecting sensors slightly out of alignment.

However, light might flow out of the light-receiving element on the monitoring light receiver 23 if the incident light beams are linear in the sub-scanning corresponding direction. Therefore, the condensing lens 22 is designed so that all of the light beams are incident on the light receiving surface of the monitoring light receiver 23.

Figure 6:
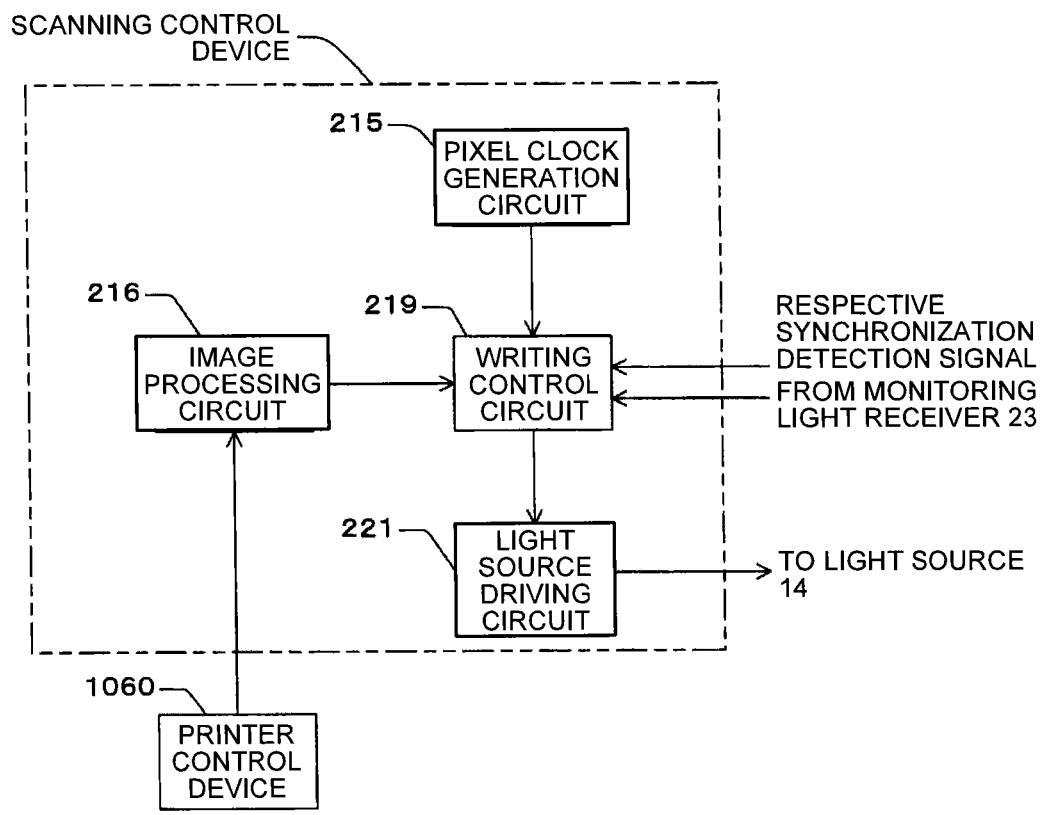
FIG. 6 is a block diagram for explaining a configuration of a scanning control device.

The scanning control device includes, as illustrated in FIG. 6 as an example, a pixel clock generation circuit 215, an image processing circuit 216, a writing control circuit 219, and a light source driving circuit 221. The arrows illustrated in FIG. 6 indicate flows of representative signals and information, but do not indicate all of connections between these blocks.

The pixel clock generation circuit 215 generates a pixel clock signal. The pixel clock signal generated by the pixel clock generation circuit 215 is supplied to the writing control circuit 219.

The image processing circuit 216 rasterizes image information received from the higher-level device via the printer control device 1060, performs predetermined processes such as halftone processing, and creates image data representing the gradation of each pixel for each of the light-emitting elements.

The writing control circuit 219 generates a pulse modulating signal based on the image data received from the image processing circuit 216, the pixel clock signal received from the pixel clock generation circuit 215, and the leading edge synchronization detection signal.

The writing control circuit 219 corrects a driving current for each of the light-emitting elements at predetermined operational timing based on the output signal of the monitoring light receiver 23 so that the amount of light received by the monitoring light receiver 23 is adjusted to be a desired level. In other words, the writing control circuit 219 performs auto power control (APC).

Furthermore, the writing control circuit 219 also obtains the time period required for the light beams to scan between the two synchronization detecting sensors from the leading edge synchronization detection signal and the trailing edge synchronization detection signal at a predetermined operational timing, and re-sets the reference frequency of the pixel clock signal so that a preset number of pulses fits within the time period.

The light source driving circuit 221 drives each of the light-emitting elements that are provided in the surface emitting laser array 100 based on the pulse modulation signal received from the writing control circuit 219.

Figure 7:
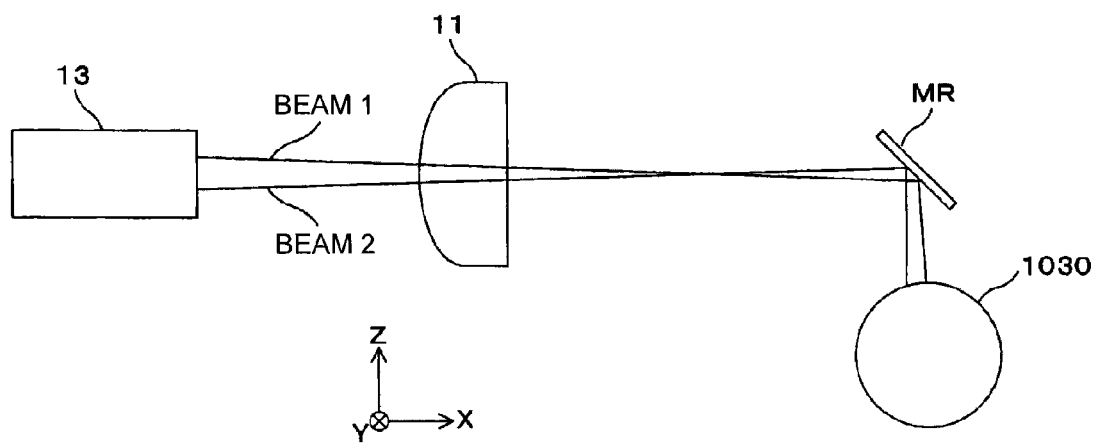
FIG. 7 is a schematic for explaining the optical paths of a light beam 1 and a light beam 2.

As illustrated in FIG. 7 as an example, because a light beam output from ch1 (referred to as a light beam 1) and a light beam output from ch31 (referred to as a light beam 2) pass through different positions in the scanning lens 11 along the sub-scanning corresponding direction (the Z-axis direction in this example), these light beams are affected by birefringence in a different manner. Therefore, the reflectance of the light beam 1 and the reflectance of the light beam 2 on the folding mirror MR are different from each other, and as a result, the amounts of the light beam 1 and the light beam 2 on the photosensitive element 1030 are different from each other.

In the first exemplary configuration, because the light beams enter into the monitoring light receiver 23 without passing through the scanning lens 11, the light beams are not affected by the birefringence of the scanning lens 11. Therefore, even if the amount of light output from the light source 14 is controlled by feeding back the amount of light received by the monitoring light receiver 23, the problem of birefringence affecting the amount of light on the photosensitive element 1030 twice does not occur.

Furthermore, because the monitoring light receiver 23 is disposed behind the polygon mirror 13, a target amount of light required on the photosensitive element can be maintained more accurately, compared with the technologies disclosed in Japanese Patent Application Laid-open No. 2002-26445, Japanese Patent Application Laid-open No. 2005-274678, and Japanese Patent Application Laid-open No. 2007-298563.

More specifically, (1) fluctuations in light usage efficiency attributable to the shape or the size of the aperture on the aperture plate 16, (2) fluctuations in the transmittance in the cylindrical lens 17, and (3) fluctuations in the reflectance on the deflection reflecting surface of the polygon mirror 13 are reflected in the amount of light received by the monitoring light receiver 23. Therefore, more accurate feedback control can be achieved.

For example, control for increasing the amount of output light can be performed when the reflectance on the deflection reflecting surface of the polygon mirror 13 is lower than a designed value. Such control can not be performed in the technologies disclosed in Japanese Patent Application Laid-open No. 2002-26445, Japanese Patent Application Laid-open No. 2005-274678, and Japanese Patent Application Laid-open No. 2007-298563.

Furthermore, flexibility in layout is enhanced because the reflecting mirror 21 is disposed between the polygon mirror 13 and the monitoring light receiver 23 so that the size of the entire optical scanning device can be reduced.

Figure 8:
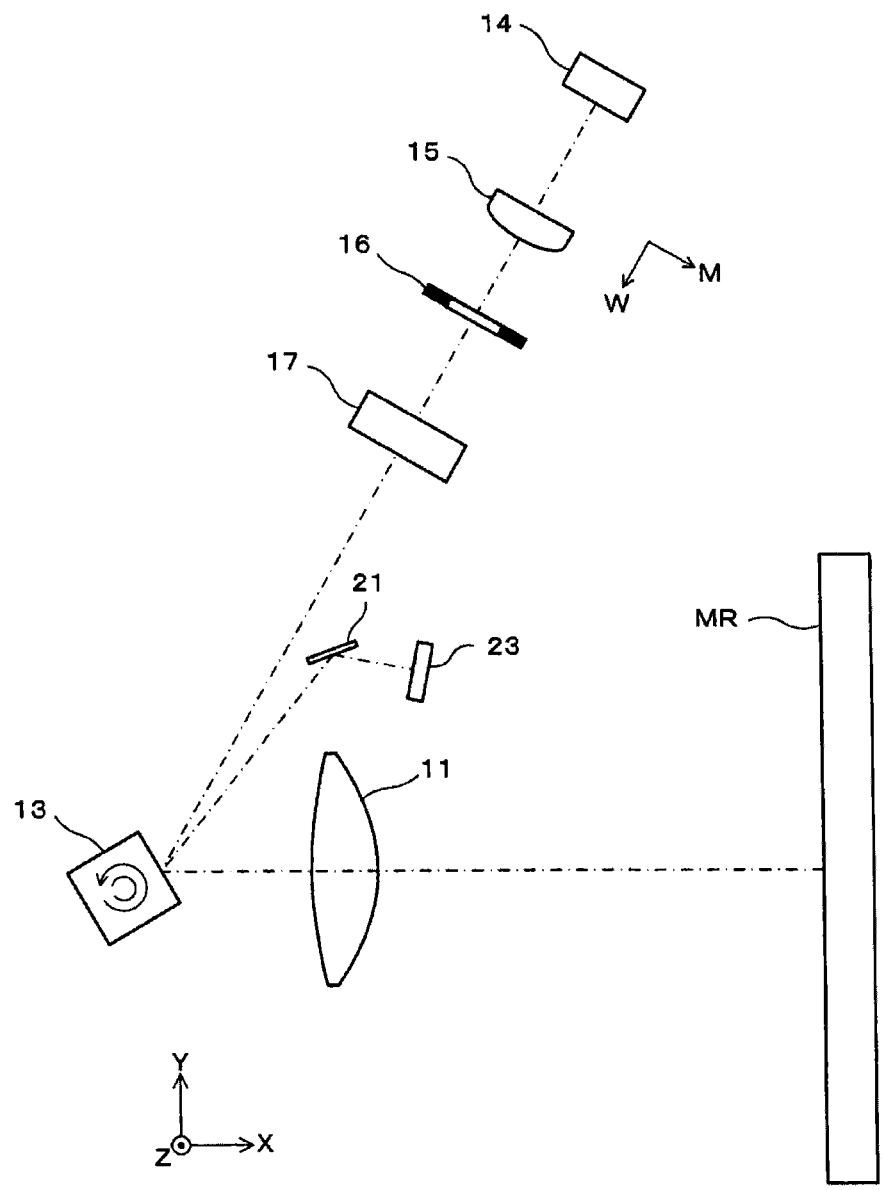
FIG. 8 is a schematic for explaining a modification of the first exemplary configuration.

The condensing lens 22 may be omitted as illustrated in FIG. 8 as an example as long as the detection accuracy is not affected.

Other exemplary configurations will now be explained. Differences with the first exemplary configuration will be mainly explained. The same or equivalent components are given with the same reference numerals, and explanations thereof are simplified or omitted.

Second Exemplary Configuration

Figure 9:
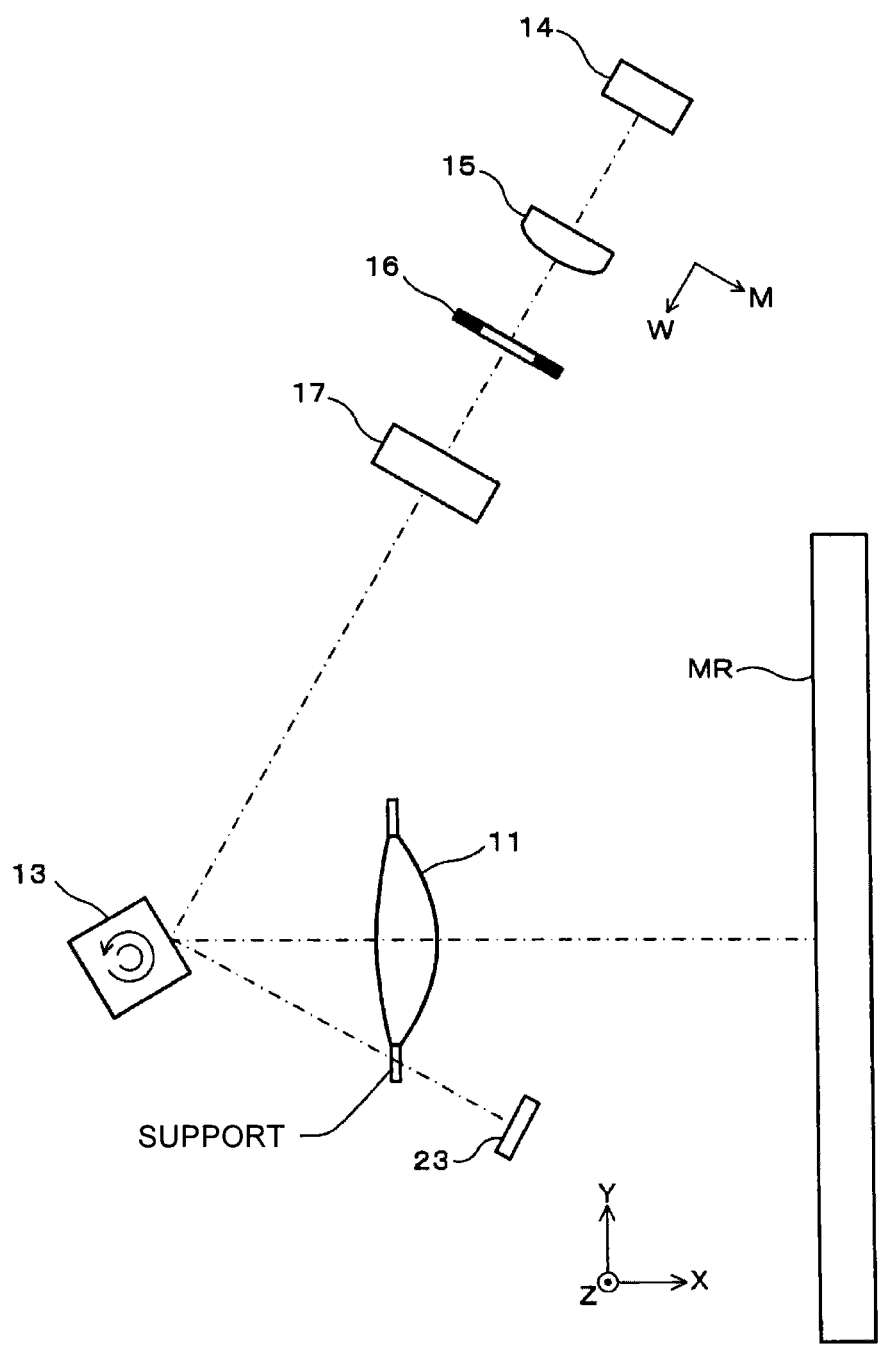
FIG. 9 is a schematic for explaining a second exemplary configuration of the optical scanning device.

In a second exemplary configuration as illustrated in FIG. 9 as an example, the light beams passing through a support of the scanning lens 11 enters the monitoring light receiver 23 as the light-amount monitoring light beams.

In this configuration, because the light-amount monitoring light beams deflected by the polygon mirror 13 are converted into weak convergent light while passing through the support of the scanning lens 11, the condensing lens 22 included in the first exemplary configuration is not required.

During injection molding of the scanning lens, if the lens has a thick part and a thin part, it takes long for the thick part to cool down when the mold is being cooled, while the thin part cools down relatively quickly. This is one of the factors causing an uneven refractive-index distribution or birefringence distribution.

However, because the support has a substantially constant thickness, the birefringence distribution in the support is substantially uniform. Thus, even if the amount of light output from the light source 14 is controlled by feeding back the amount of light received by the monitoring light receiver 23 using the light beams passing through the support as light-amount monitoring light beams, the problem of birefringence affecting the amount of light on the photosensitive element 1030 twice does not occur.

In the second exemplary configuration, because the reflecting mirror 21 and the condensing lens 22 included in the first exemplary configuration are eliminated, the number of components can be reduced compared with that in the first exemplary configuration.

Third Exemplary Configuration

Figure 10:
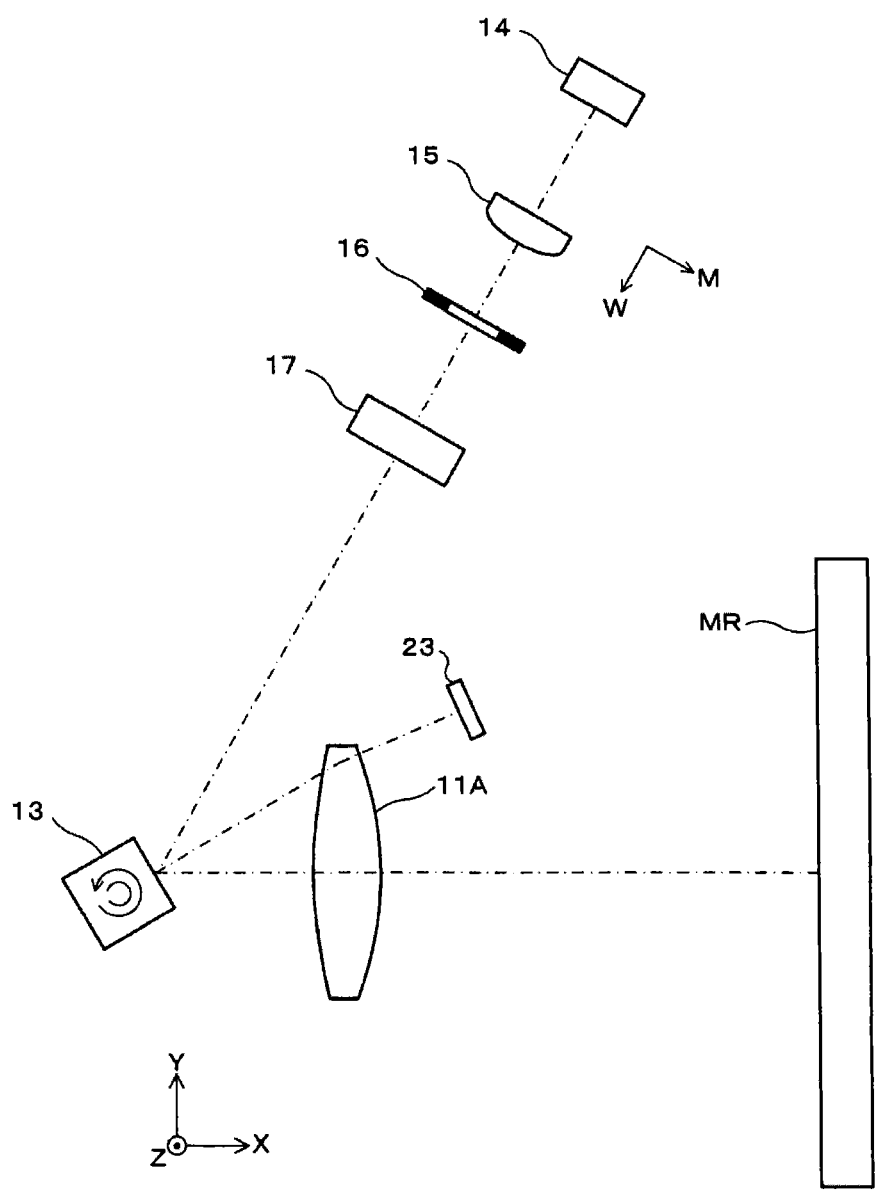
FIG. 10 is a schematic for explaining a third exemplary configuration of the optical scanning device.

In a third exemplary configuration, as illustrated in FIG. 10 as an example, a different scanning lens (scanning lens 11A) from those used in the first and the second exemplary configurations is used.

The scanning lens 11A is a molded plastic scanning lens and has a smaller thickness difference than the scanning lens 11 used in the first and the second exemplary configurations. In other words, although the scanning lens 11A has a thickness (the thickness in the X-axis direction) that differs depending on the positions in the main-scanning corresponding direction (the Y-axis direction in this example), the difference between the thickest and the thinnest thickness value is smaller.

The light beams that have passed through the edge of the optical surface area of the scanning lens 11A enter the monitoring light receiver 23 as light-amount monitoring light beams.

In this configuration, because the light-amount monitoring light beams deflected by the polygon mirror 13 are converted into weak convergent light while passing through the scanning lens 11A, the condensing lens 22 included in the first exemplary configuration is not necessary.

In the third exemplary configuration, because the light beams travelling toward the monitoring light receiver 23 pass through the scanning lens 11A, birefringence affecting the light beam 1 and the light beam 2 is different, for example. However, what is disadvantageous is not different birefringence of each light beam, but different reflectance of each light beam on the folding mirror because of the different birefringence affecting each light beam.

Therefore, even if the light beam 1 and the light beam 2 pass through the scanning lens 11A, there is little effect of birefringence as long as the light beam 1 and the light beam 2 enter the monitoring light receiver 23 without using the folding mirror MR thereafter. When a glass plate or the like is provided on the surface of the light-receiving element of the monitoring light receiver 23, it is preferable to arrange the light receiving surface of the monitoring light receiver 23 perpendicular to the incident light, so that the transmittance of the light beam 1 and the light beam 2 will not be different.

Fourth Exemplary Configuration

Figure 11:
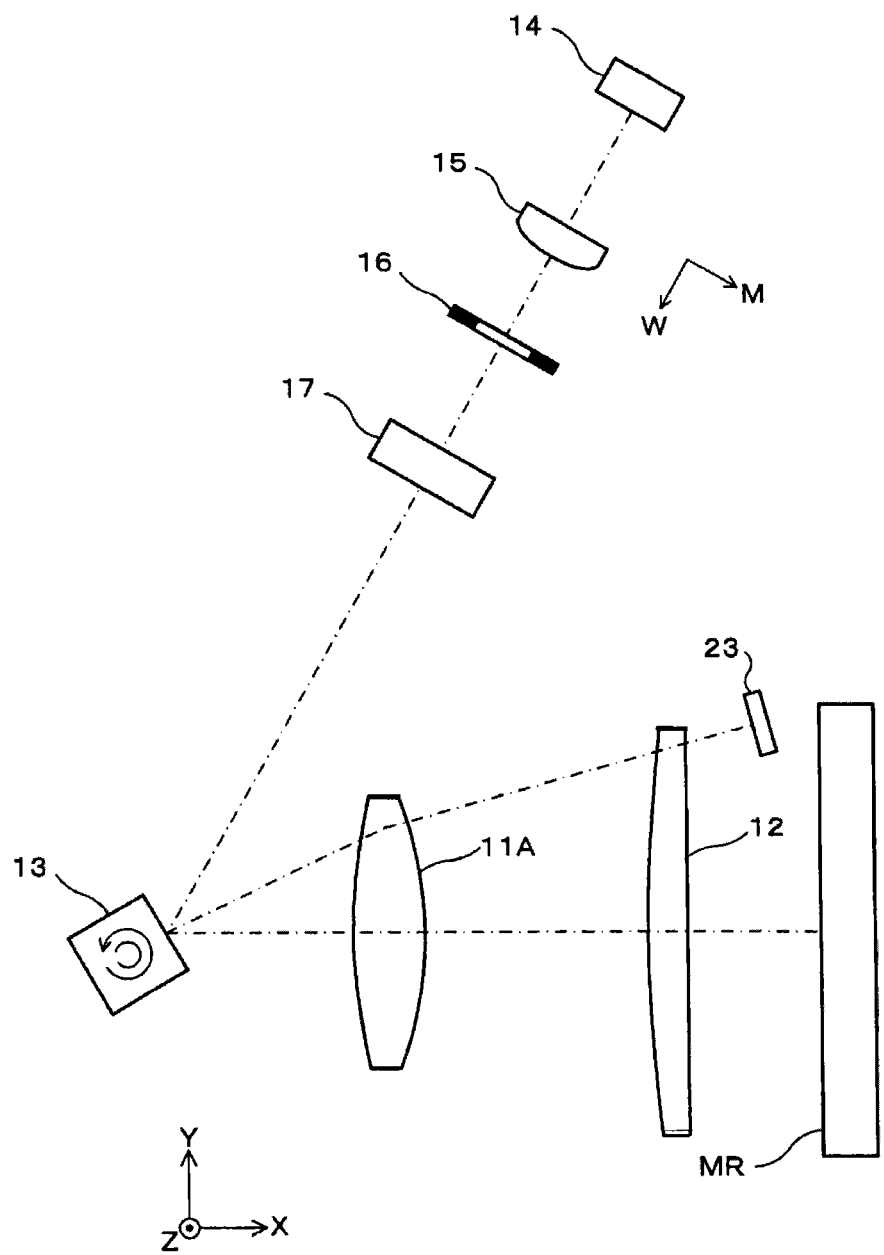
FIG. 11 is a schematic for explaining a fourth exemplary configuration of the optical scanning device.
Figure 12:
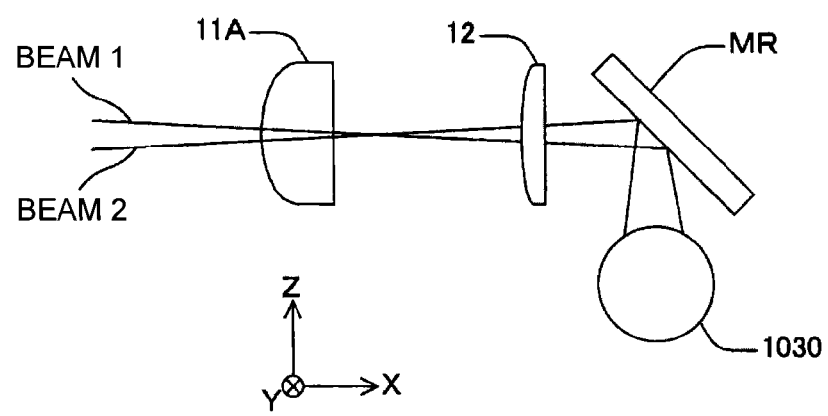
FIG. 12 is a schematic for explaining the optical paths of the light beam 1 and the light beam 2 in the fourth exemplary configuration.

In a fourth exemplary configuration, as illustrated in FIGS. 11 and 12 as an example, a scanning lens 12 is added to the third exemplary configuration. The scanning lens 12 is made of glass, and will not cause uneven birefringence.

The light beams passing through the edge of the scanning lens 11A and the edge of the scanning lens 12 enter the monitoring light receiver 23 as light-amount monitoring light beams.

In the fourth exemplary configuration, because the scanning lens 12 is made of a glass lens, the light-amount monitoring can be considered equivalent to that in the third exemplary configuration.

Fifth Exemplary Configuration

Figure 13:
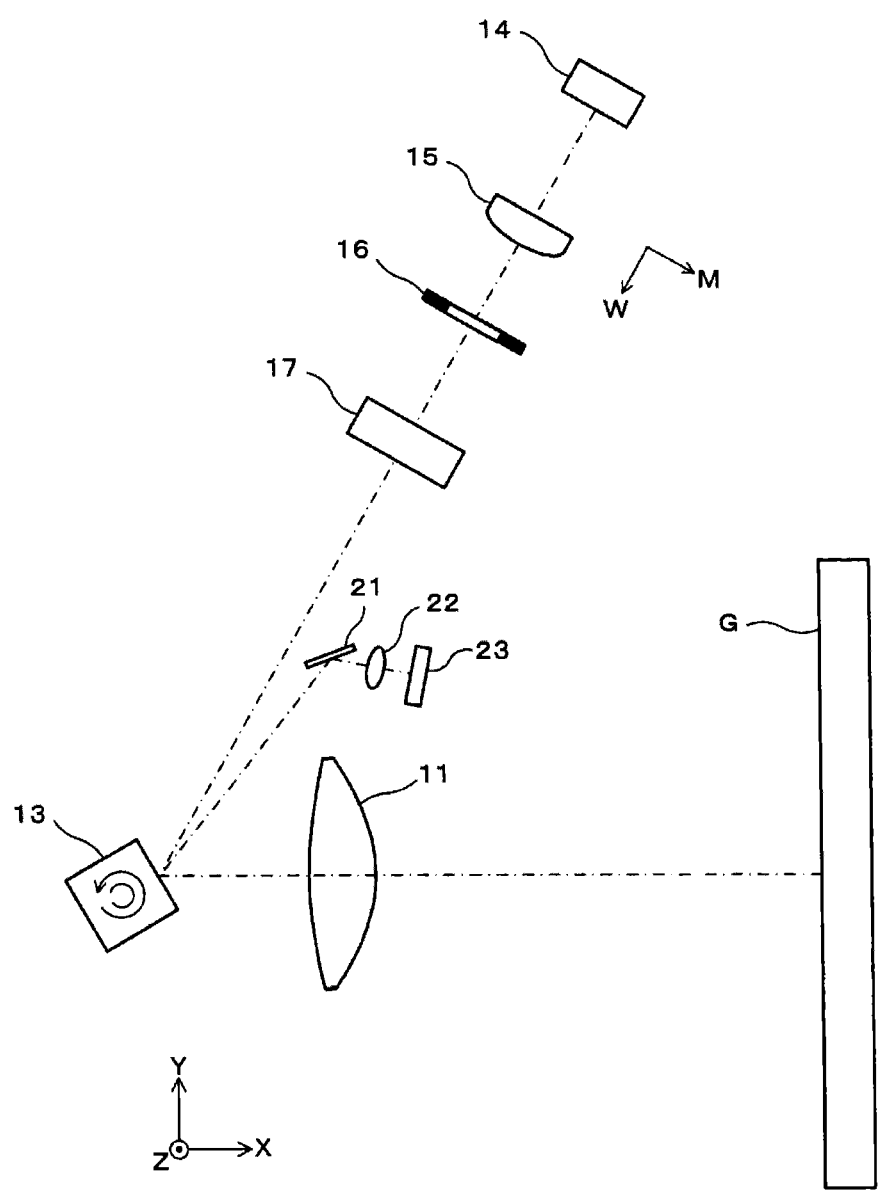
FIG. 13 is a schematic for explaining a fifth exemplary configuration of the optical scanning device.

In a fifth exemplary configuration as illustrated in FIG. 13 as an example, a sheet glass (dust preventing glass) G is used instead of the folding mirror MR that is used in the first exemplary configuration.

The sheet glass G is applied with anti-reflection coating.

In the fifth exemplary configuration, because the light beams incident onto the monitoring light receiver 23 do not pass through the scanning lens 11 in the same manner as in the first exemplary configuration, the light beams are not affected by birefringence. Therefore, even if the amount of light output from the light source 14 is controlled by feeding back the amount of light received by the monitoring light receiver 23, the problem of birefringence affecting the amount of light on the photosensitive element 1030 twice does not occur.

A sheet glass disposed between the scanning lens 11 and the photosensitive element 1030 typically has an uneven transmittance distribution corresponding to the uneven birefringence distribution in the scanning lens 11. However, in the fifth exemplary configuration, because the anti-reflection coating is applied onto the sheet glass G, fluctuations in transmittance caused by the different polarizations of the incident light can be suppressed.

Sixth Exemplary Configuration

Figure 14:
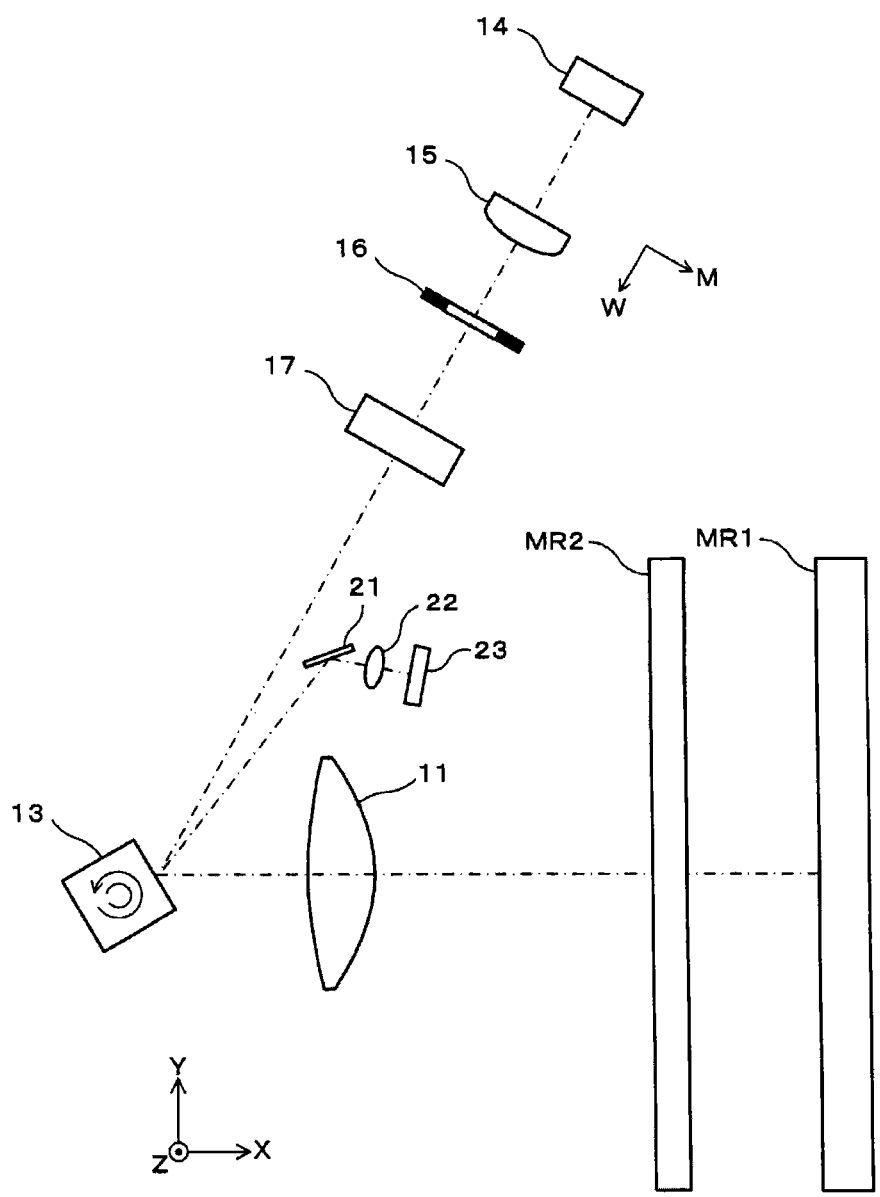
FIG. 14 is a first schematic for explaining a sixth exemplary configuration of the optical scanning device.

In a sixth exemplary configuration, as illustrated in FIG. 14 as an example, two sheets of folding mirrors (MR1 and MR2) are used instead of the folding mirror MR in the first exemplary configuration.

In the sixth exemplary configuration, because the light beams incident onto the monitoring light receiver 23 do not pass through the scanning lens 11 in the same manner as in the first exemplary configuration, the light beams are not affected by birefringence. Therefore, even if the amount of light output from the light source 14 is controlled by feeding back the amount of light received by the monitoring light receiver 23, the problem of birefringence affecting the amount of light on the photosensitive element 1030 twice does not occur.

Figure 15:
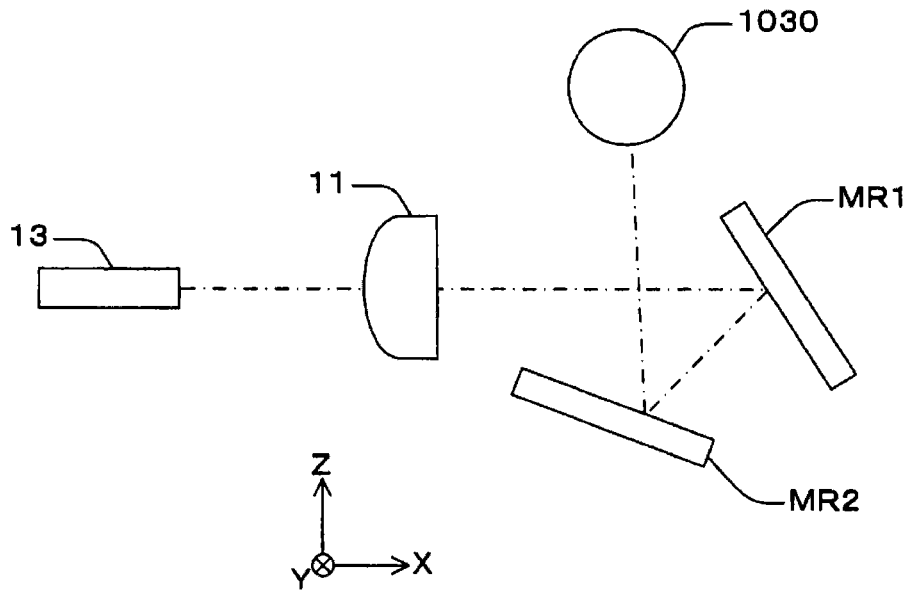
FIG. 15 is a second schematic for explaining the sixth exemplary configuration of the optical scanning device.

As illustrated in FIG. 15 as an example, the folding mirror MR1 is disposed on the optical paths of the light beams that have passed through the scanning lens 11, and is inclined with respect to the X-axis direction on the X-Z plane. The folding mirror MR2 is disposed on the optical path of the light beam reflected on the folding mirror MR1, and is inclined with respect to the X-axis direction on the X-Z plane.

Figure 16:
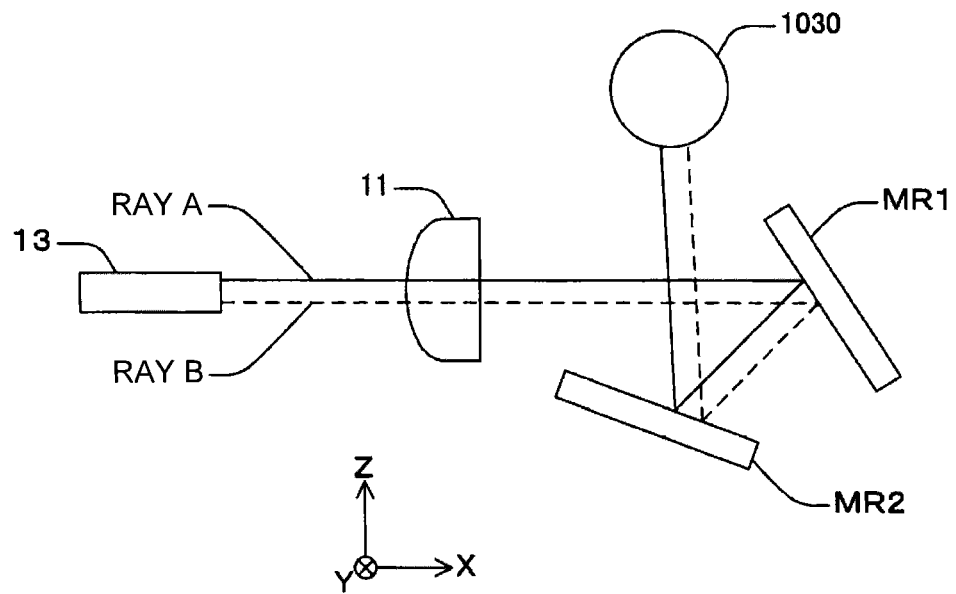
FIG. 16 is a schematic for explaining the optical paths of a ray A and a ray B in the sixth exemplary configuration.

Out of the two rays included in the light beams output from the light-emitting element ch1 and being separated from each other in the Z-axis direction, the +Z side ray is denoted as a ray A, and the −Z side ray is denoted as a ray B, for example, as illustrated in FIG. 16.

Figure 17:
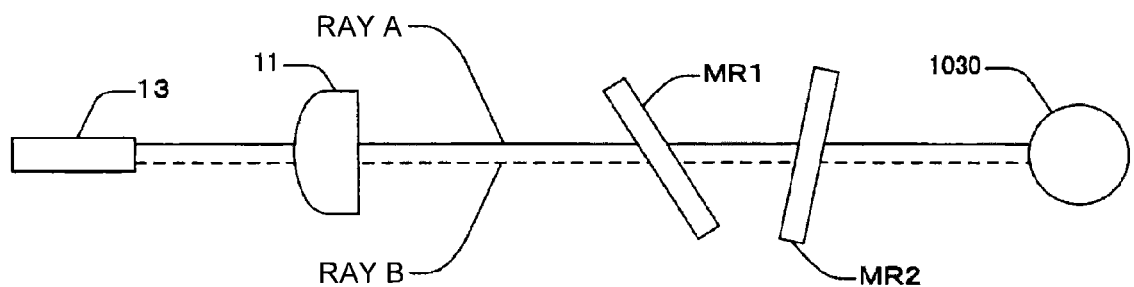
FIG. 17 is a development view of FIG. 16.

FIG. 17 is a development view of FIG. 16, illustrating each of the optical paths of the light rays travelling from the polygon mirror 13 to the photosensitive element 1030 in a single straight line.

A folding mirror, with which the ray A has a shorter optical path than that of the ray B from the polygon mirror 13 on a plane the rays from the polygon mirror 13 enter, is defined as a folding mirror with a "β+" inclination angle property. On the contrary, a folding mirror, with which the ray B has a shorter optical path than that of the ray A, is defined as a folding mirror with a "β−" inclination angle property.

In this example, as in FIG. 17, the folding mirror MR1 is a folding mirror with a "β+" inclination angle property, and the folding mirror MR2 is a folding mirror with a "β−" inclination angle property.

This configuration makes the incident position dependency of the reflectance of the writing light beams projecting toward the photosensitive element caused by changes in polarization in an uneven birefringence distribution of the scanning lens 11 to be opposite by the folding mirror MR1 and in the folding mirror MR2. Accordingly, fluctuations in the light amounts on the photosensitive element 1030 can be cancelled out.

Figure 18:
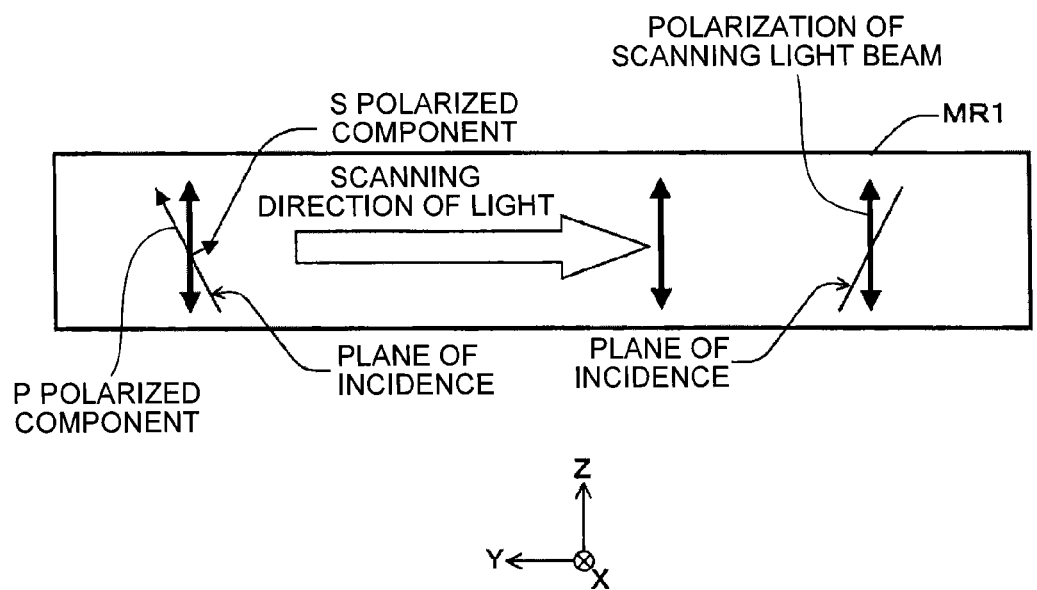
FIG. 18 is a first schematic for explaining the relation between a position and a plane of incidence of scanning light beams in a folding mirror.

More specifically, because the light output from the light source 14 is linearly polarized light oscillating in a direction perpendicular to the X-Y plane, the scanning light beams that are incident on the folding mirror MR1 are polarized in a direction parallel with the Z axis as illustrated in FIG. 18. On the contrary, the planes of incidence (planes including both incident light and reflected light) of the rays that are incident on the folding mirror MR1 are inclined by different degrees depending on the positions on which the rays are incident.

The reflectance of light at a certain position of incidence on the folding mirror MR1 can be calculated by separating the linearly polarized light oscillating in a direction parallel with the Z axis into an S polarized component and a P polarized component at a +Y end of the folding mirror MR1, and then adding the reflectance of the S polarized light and that of the P polarized light in their component ratio.

Figure 19:
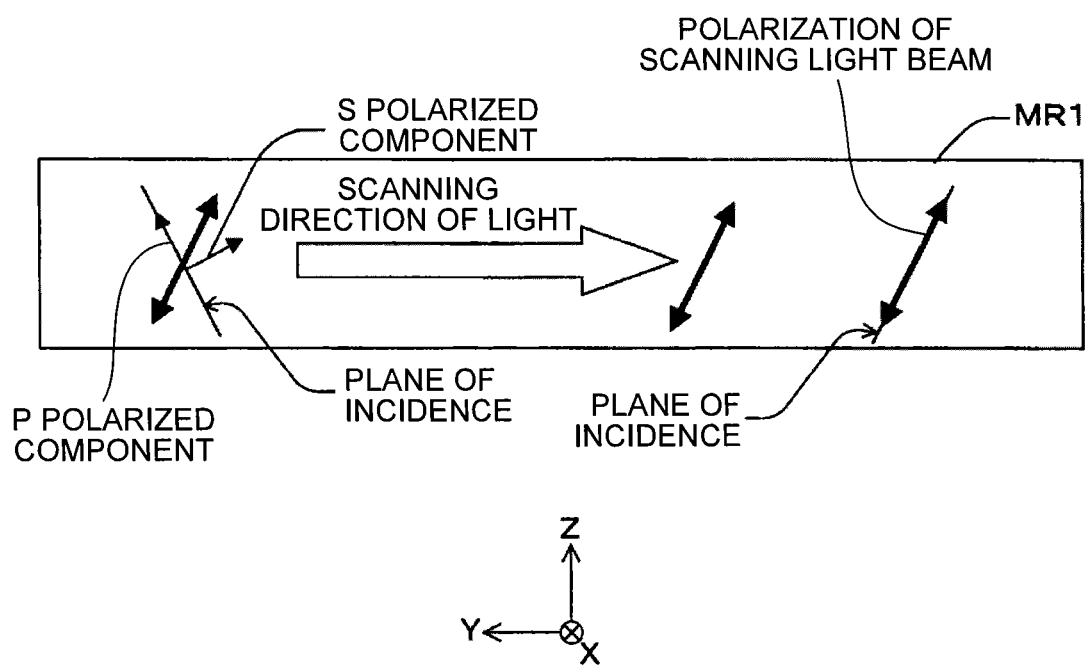
FIG. 19 is a second schematic for explaining the relation between a position and a plane of incidence of the scanning light beams on the folding mirror.

If the polarizations of the writing light beams are changed under the influence of the birefringence of the scanning lens 11, e.g., the linearly polarized light is rotated, the component ratio between the S polarized component and the P polarized component will also change as illustrated in FIG. 19 as an example. This also changes the reflectance from what is was as illustrated in FIG. 18.

Figure 20:
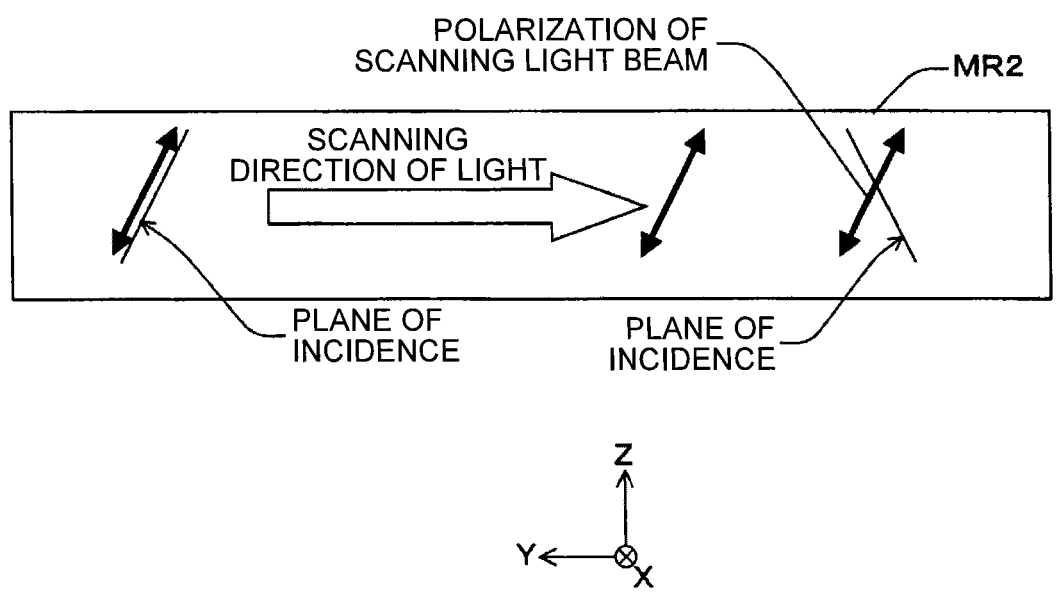
FIG. 20 is a third schematic for explaining the relation between a position and a plane of incidence of the scanning light beams on the folding mirror.

On the contrary, the folding mirror MR2 having a "β−" inclination angle property has an opposite relation between a position on which the writing light beams are incident and the plane of incidence, which is opposite to that of the folding mirror MR1 having the "β+" inclination angle property as illustrated in FIG. 20 as an example. In this manner, the effect of birefringence of the scanning lens 11 on the folding mirror MR1 is cancelled out by the folding mirror MR2.

As described above, the effect of the uneven birefringence distribution in the scanning lens 11 can be alleviated by configuring the scanning optical system to include the same numbers of the folding mirrors having the "β+" inclination angle property and the folding mirrors having the "β−" inclination angle property.

Seventh Exemplary Configuration

Figure 21:
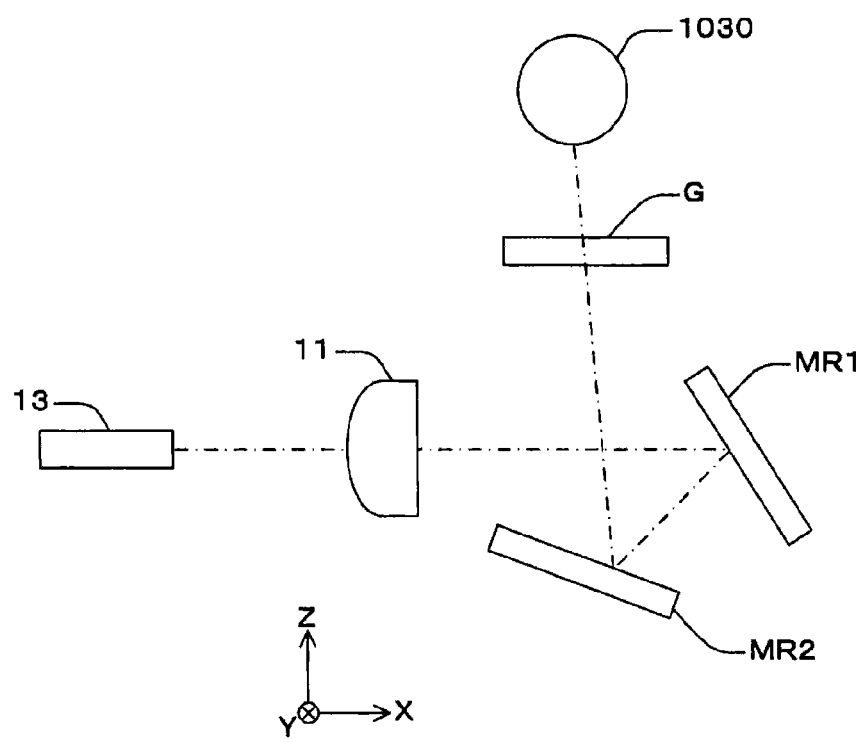
FIG. 21 is a schematic for explaining a seventh exemplary configuration of the optical scanning device.

In a seventh exemplary configuration as illustrated in FIG. 21 as an example, a sheet glass (dust preventing glass) G is added to the sixth exemplary configuration. In a situation where dust could be attached to the optical parts in the optical scanning device to scatter light thereby preventing the photosensitive element from being exposed with a desired amount of light, the sheet glass prevents such dust from entering into the optical scanning device.

In the seventh exemplary configuration, because the light beams enter the monitoring light receiver 23 without passing through the scanning lens 11, the light beams are not affected by the birefringence of the scanning lens 11 in the same manner as in the first exemplary configuration. Therefore, even if the amount of light output from the light source 14 is controlled by feeding back the amount of light received by the monitoring light receiver 23, the problem of birefringence affecting the amount of light on the photosensitive element 1030 twice does not occur.

Figure 22:
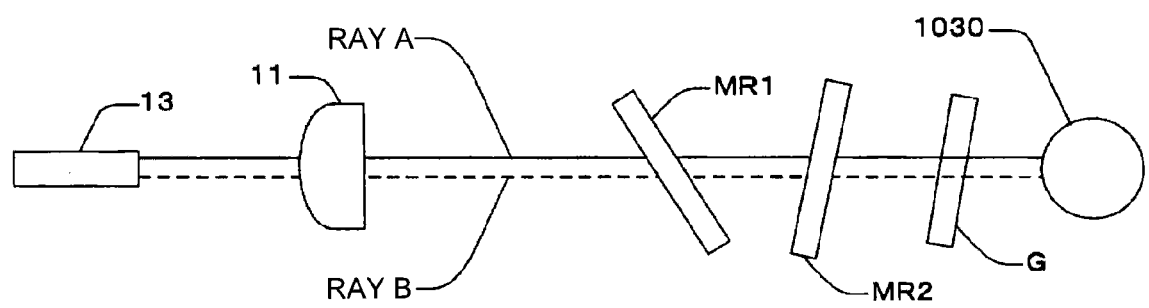
FIG. 22 is a development view of the scanning optical system according to the seventh exemplary configuration.

In this example, the folding mirror MR1 has the "β+" inclination angle property, and the folding mirror MR2 has the "β−" inclination angle property (see FIG. 22).

In the same manner as the folding mirrors, a sheet glass, with which the ray A has a shorter optical path than that of the ray B from the polygon mirror 13 on a plane that the rays from the polygon mirror 13 enter, is defined as a sheet glass with a "β+" inclination angle property. On the contrary, a sheet glass, with which the ray B has a shorter optical path than that of the ray A, is defined as a sheet glass with a "β−" inclination angle property.

In this example, the inclination angle property of the sheet glass G is "β−" (see FIG. 22).

In this example, the total number of the folding mirrors and the sheet glass is an odd number. The total number of the folding mirror with the inclination angle property "β+" and the sheet glass with the inclination angle property "β−" (m1+g2) is two, and the total number of the folding mirror with the inclination angle property "β−" and the sheet glass with the inclination angle property "β+" (m2+g1) is one. In this relation (m1+g2≠m2+g1), the cancelling effect of the uneven birefringence distribution of the scanning lens 11, described earlier in the sixth exemplary configuration, cannot be provided.

Therefore, as an example, only aluminum coating is applied onto the folding mirror MR1, and a multilayer film is applied onto the folding mirror MR2 and the sheet glass G to prevent reflections thereon.

In this manner, the effect of birefringence on the folding mirror MR2 and the sheet glass G can be cancelled out by the folding mirror MR1.

The following formula (2) is preferably satisfied by applying the multilayer film onto the folding mirror MR2, where the maximum inclination angle of the folding mirror MR2 in the X-Z cross section with respect to the light incident thereon is denoted as $\beta max$ and the reflectance of the S polarized component and the reflectance of the P polarized component on the folding mirror MR2 in the X-Z cross section are denoted as $Rs(\beta max)$ and $Rp(\beta max)$, respectively.

$$0.98 < Rs(\beta max)/Rp(\beta max) < 1.02 \quad (2)$$

The following formula (3) is preferably satisfied by applying the multilayer film onto the sheet glass G, where the maximum inclination angle of the sheet glass G in the X-Z cross section with respect to the light incident thereon is denoted as βmax and the reflectance of the S polarized component and the reflectance of the P polarized component on the sheet glass G in the X-Z cross section are denoted as Ts(βmax) and Tp(βmax), respectively.

$$0.98 < Ts(\beta max)/Tp(\beta max) < 1.02 \qquad (3)$$

Eighth Exemplary Configuration

Figure 23:
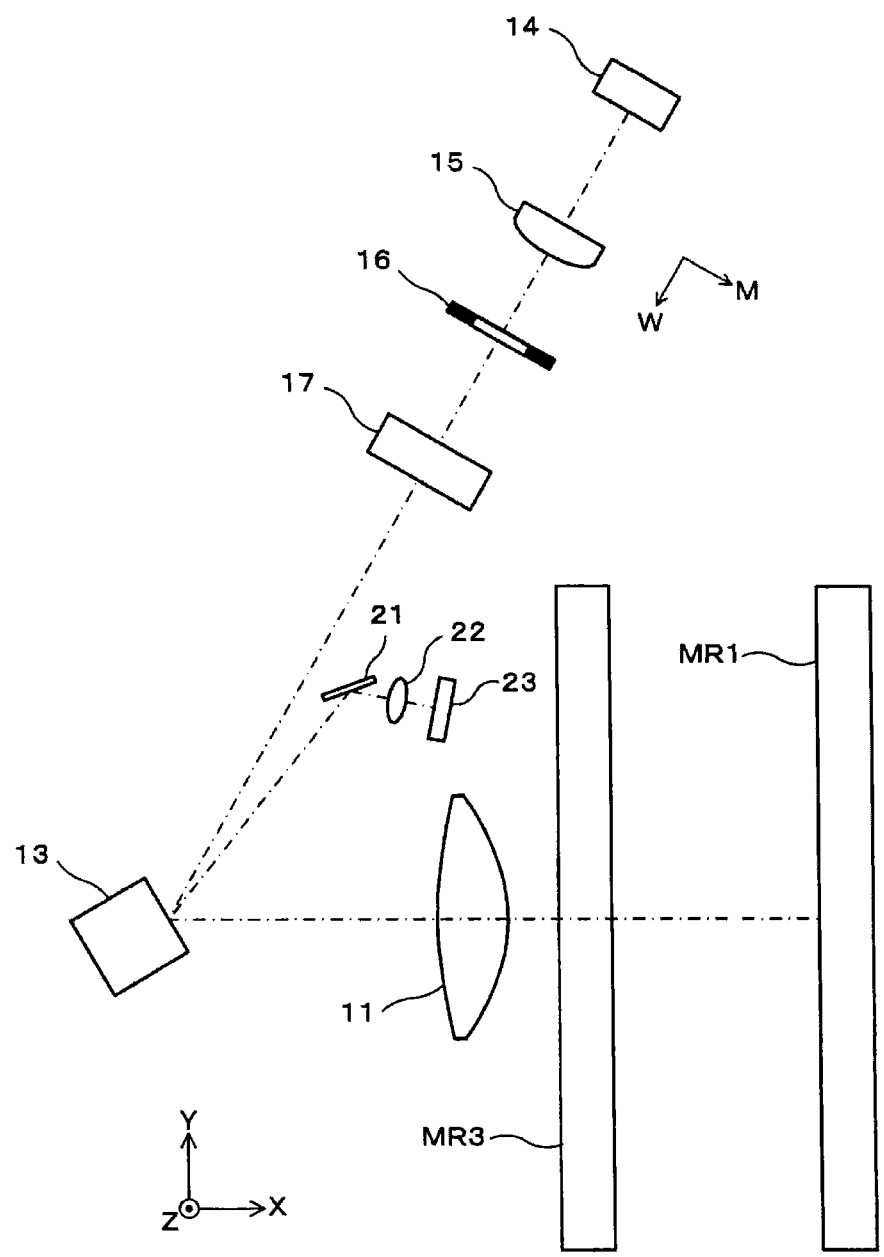
FIG. 23 is a first schematic for explaining an eighth exemplary configuration of the optical scanning device.
Figure 24:
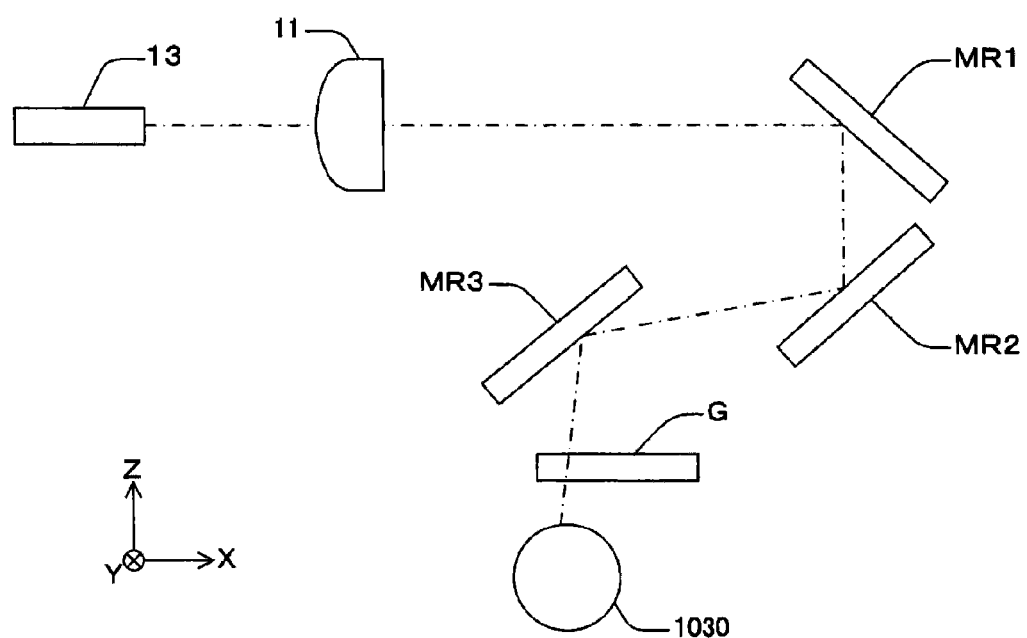
FIG. 24 is a second schematic for explaining the eighth exemplary configuration of the optical scanning device.

In an eighth exemplary configuration, as illustrated in FIGS. 23 and 24 as examples, a folding mirror MR3 and a sheet glass (dust preventing glass) G are added to the sixth exemplary configuration.

In the eighth exemplary configuration, because the light beams enter the monitoring light receiver 23 without passing through the scanning lens 11, the light beams are not affected by the birefringence of the scanning lens 11 in the same manner as in the first exemplary configuration. Therefore, even if the amount of light output from the light source 14 is controlled by feeding back the amount of light received by the monitoring light receiver 23, the problem of birefringence affecting the amount of light on the photosensitive element 1030 twice does not occur.

Figure 25:
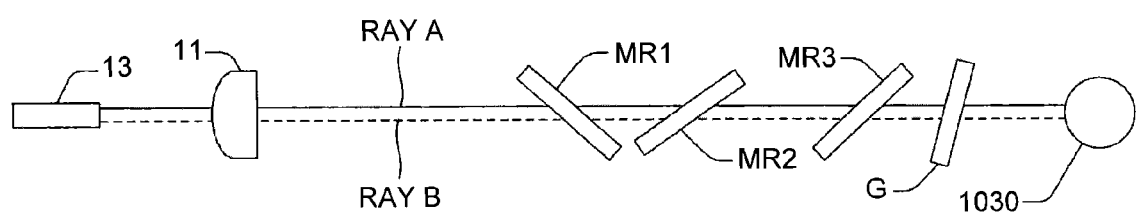
FIG. 25 is a development view of the scanning optical system according to the eighth exemplary configuration.

In this example, the folding mirror MR1 has the "β+" inclination angle property, and the folding mirror MR2 and the folding mirror MR3 have the "β−" inclination angle property (see FIG. 25).

The sheet glass G has the "β−" inclination angle property (see FIG. 25).

In this example, the total number of the folding mirror with the "β+" inclination angle property and the sheet glass with the "β−" inclination angle property (m1+g2) is two, and the total number of the folding mirrors with the "β−" inclination angle property and the sheet glass with the "β+" inclination angle property (m2+g1) is two. In this relation (m1+g2=m2+g1), the cancelling effect of the uneven birefringence distribution of the scanning lens 11, described earlier in the sixth exemplary configuration, can be provided.

In other words, the incident position dependency of the reflectance of the writing light beams which is caused by changes in polarization in an uneven birefringence distribution of the scanning lens 11 is the same on the folding mirror MR1 and the sheet glass G, and is the same on the folding mirror MR2 and the folding mirror MR3 as well. Because such an incident position dependency is opposite on the folding mirror MR2 and the folding mirror MR3 to those on the folding mirror MR1 and the sheet glass G, the fluctuations in the light amount on the photosensitive element 1030 can be cancelled out.

Ninth Exemplary Configuration

Figure 26:
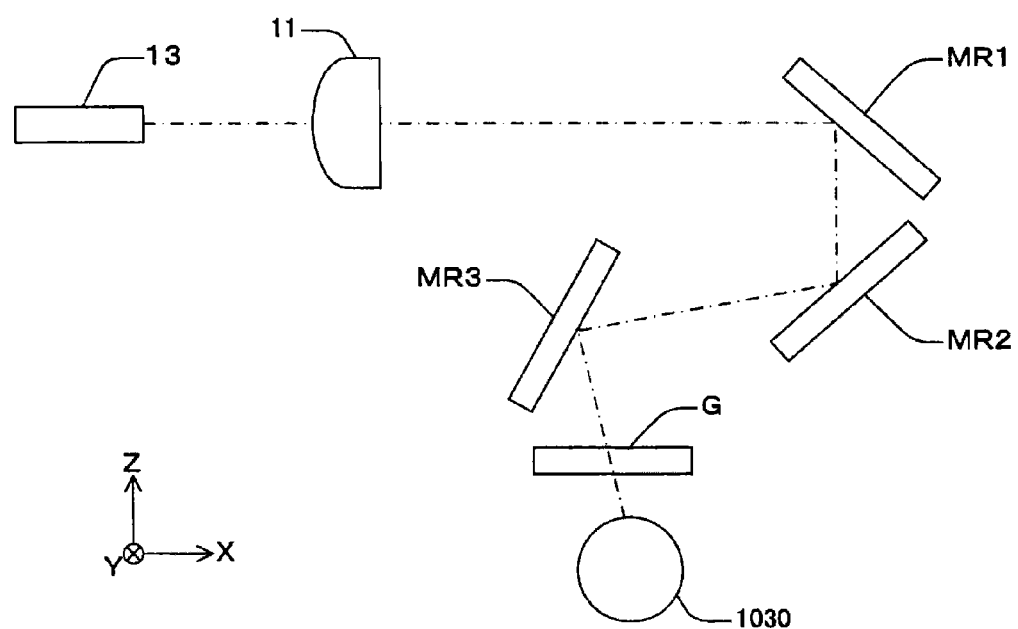
FIG. 26 is a schematic for explaining a ninth exemplary configuration of the optical scanning device.

In a ninth exemplary configuration, as illustrated in FIG. 26 as an example, a folding mirror MR3 and a sheet glass (dust preventing glass) G are added to the sixth exemplary configuration.

In the ninth exemplary configuration, because the light beams enter the monitoring light receiver 23 without passing through the scanning lens 11, the light beams are not affected by the birefringence of the scanning lens 11 in the same manner as in the first exemplary configuration. Therefore, even if the amount of light output from the light source 14 is controlled by feeding back the amount of light received by the monitoring light receiver 23, the problem of birefringence affecting the amount of light on the photosensitive element 1030 twice does not occur.

Figure 27:
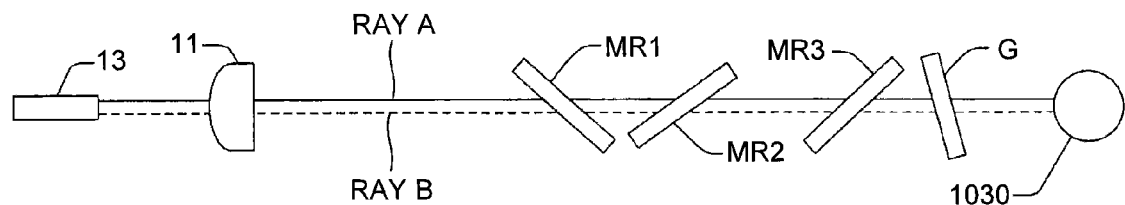
FIG. 27 is a development view of the scanning optical system according to the ninth exemplary configuration.

In this example, the folding mirror MR1 has the "β+" inclination angle property, and the folding mirror MR2 and the folding mirror MR3 have the "β−" inclination angle property (see FIG. 27).

The sheet glass G has the "β+" inclination angle property (see FIG. 27).

In this example, the total number of the folding mirror with the inclination angle property "β+" and the sheet glass with the inclination angle property "β−" (m1+g2) is one, and the total number of the folding mirrors with the inclination angle property "β−" and the sheet glass with the inclination angle property "β+" (m2+g1) is three. In this relation (m1+g2≠m2+g1), the cancelling effect of the uneven birefringence distribution of the scanning lens 11, described earlier in the sixth exemplary configuration, cannot be provided.

Therefore, as an example, only aluminum coating is applied onto the folding mirror MR1, and a multilayer film is applied onto the folding mirror MR2, the folding mirror MR3, and the sheet glass G so as to prevent reflections thereon.

In this manner, the effect of birefringence on the folding mirror MR2, the folding mirror MR3, and the sheet glass G can be cancelled out by the folding mirror MR1.

The formula (2) mentioned above is preferably satisfied for the folding mirror MR2 and the folding mirror MR3.

Furthermore, the formula (3) mentioned above is preferably satisfied for the sheet glass G.

Tenth Exemplary Configuration

Figure 28:
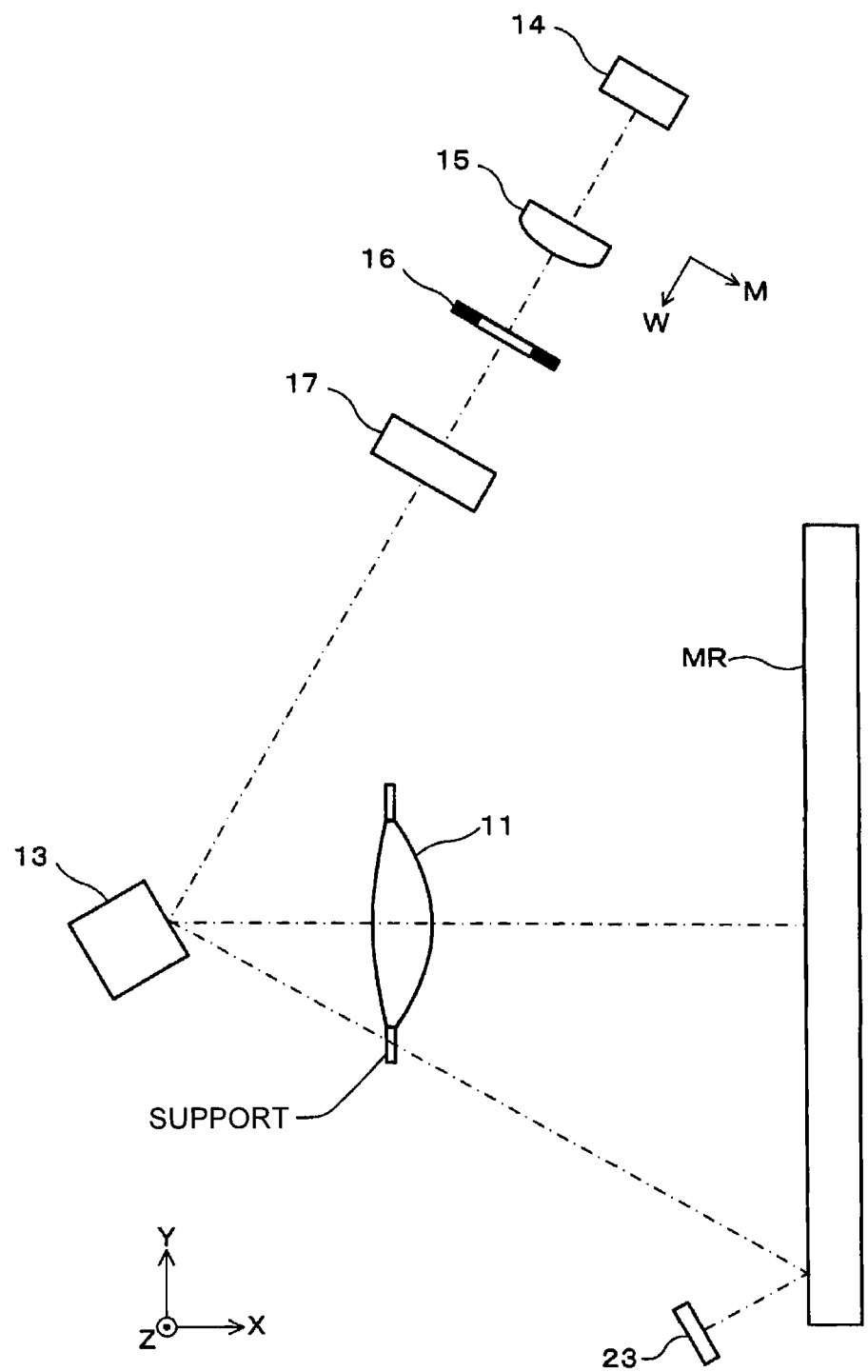
FIG. 28 is a schematic for explaining a tenth exemplary configuration of the optical scanning device.

In a tenth exemplary configuration, as illustrated in FIG. 28 as an example, the light beams that have passed through the support of the scanning lens 11 enter the monitoring light receiver 23 via the folding mirror MR as light-amount monitoring light beams.

In this example, because the light-amount monitoring light beams are scarcely affected by the uneven birefringence while passing through the scanning lens 11, the reflectance of these light beams on the folding mirror MR is not affected.

As can be clear from the explanations above, in the optical scanning device 1010 according to the embodiment, a controller for the optical scanning device according to the present invention is provided by the scanning control device.

As described above, the optical scanning device 1010 according to the embodiment includes the light source 14, the coupling lens 15, the aperture plate 16, the cylindrical lens 17, the polygon mirror 13, the monitoring light receiver 23, the plastic-molded scanning lens 11, and at least either one of one or more folding mirrors and sheet glass.

Because the light beams incident on the monitoring light receiver 23 are hardly affected by the uneven birefringence of the scanning lens 11, even if the amount of light output from the light source 14 is controlled by feeding back the amount of light received by the monitoring light receiver 23, the problem of birefringence affecting the amount of light on the photosensitive element 1030 twice does not occur.

Therefore, even if the optical scanning device 1010 includes a multi-beam light source and a plastic molded scanning lens, highly accurate optical scanning can be achieved.

Furthermore, because the laser printer 1000 according to the embodiment includes the optical scanning device 1010, the costs can be reduced without compromising the image quality.

In the embodiment, the light source 14 includes forty light-emitting elements. However, the present invention is not limited thereto.

Furthermore, in the embodiment, ten exemplary configurations of the optical scanning device 1010 are explained. However, the present invention is not limited thereto.

Furthermore, in the embodiment, the laser printer 1000 is given as an example of the image forming apparatus. However, the present invention is not limited thereto.

For example, the optical scanning device 1010 may be used in an image forming apparatus that directly irradiates a medium (paper, for example) colored by a laser beam with a laser beam.

Alternatively, the optical scanning device 1010 may be used in an image forming apparatus using a silver salt film as an image carrier. In such a configuration, a latent image is formed on the silver salt film by optical scanning. Such a latent image can be visualized by a process that is equivalent to a developing process in usual silver halide photography. The image can then be transferred onto printing paper by a process that is equivalent to a printing process in the usual silver halide photography. Such an image forming apparatus can be realized as an optical print making apparatus or an optical drawing apparatus for drawing a computed tomography (CT) scan image, for example.

The optical scanning device 1010 is also suitable for image forming apparatuses other than a printer, for example such as a copier, a facsimile, or a multifunction product (MFP) having all of these functions.

Figure 29:
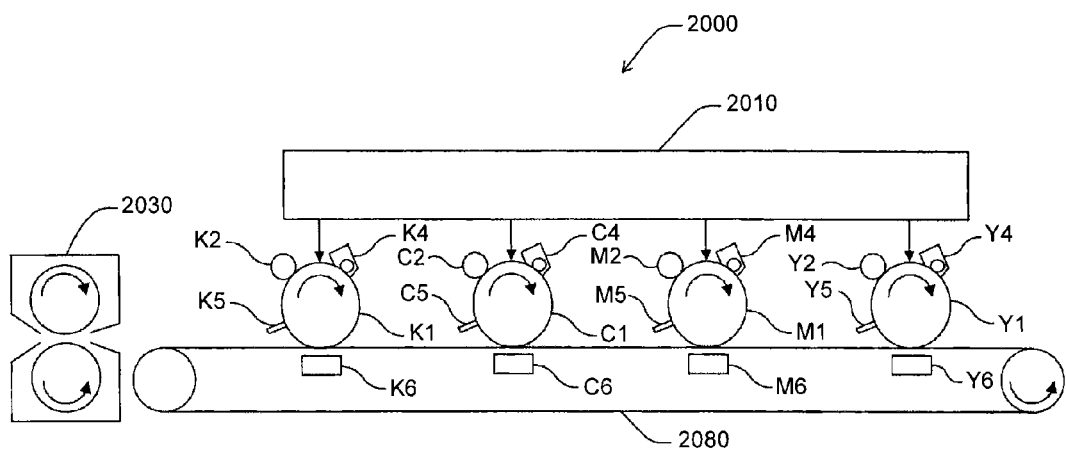
FIG. 29 is a schematic of a general structure of a color printer.
Figure 31:
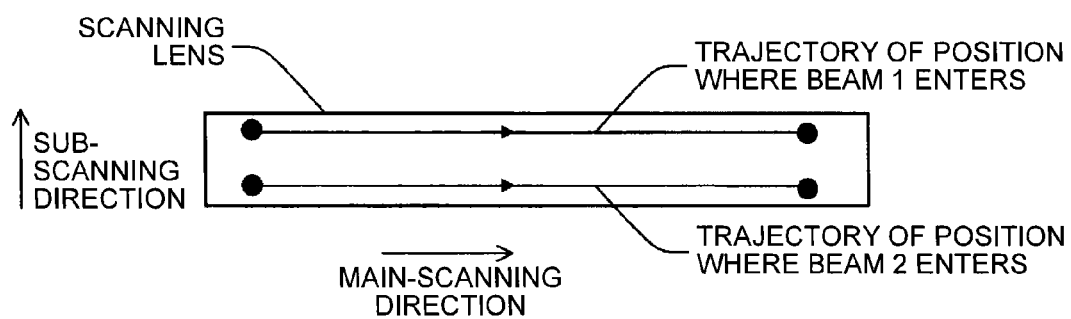
FIG. 31 is a schematic for explaining a beam 1 and a beam 2 that are incident into the plastic molded scanning lens.
Figure 32:
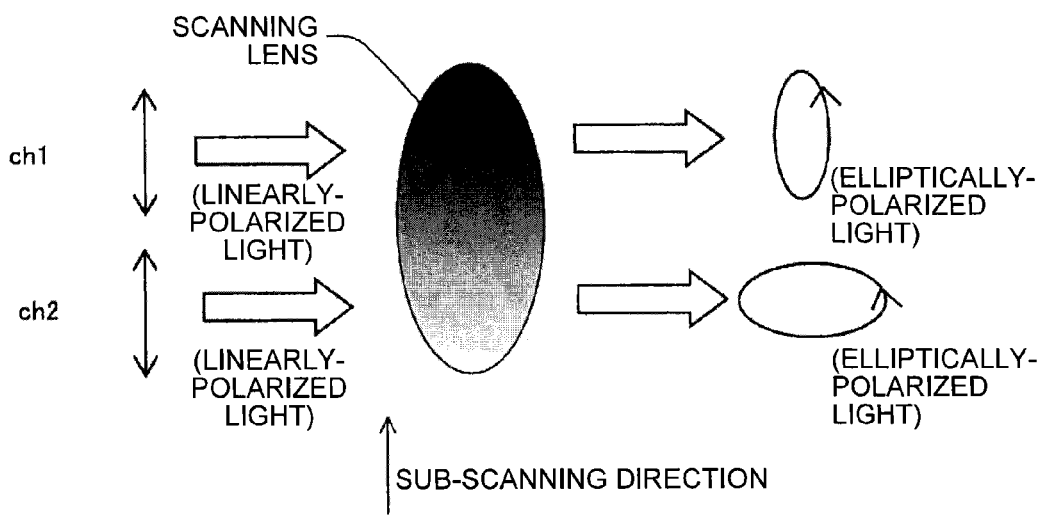
FIG. 32 is a schematic for explaining the polarizations of the beam 1 and the beam 2 after passing through the plastic molded scanning lens.
Figure 33A:
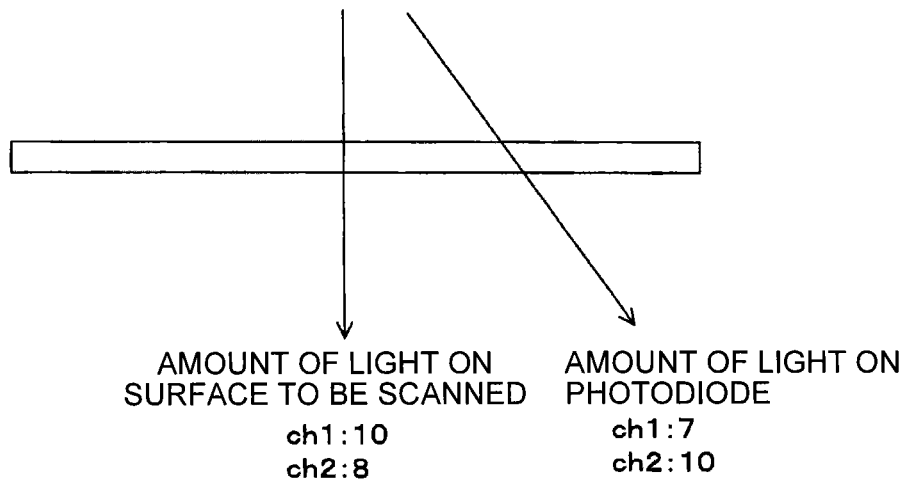
FIGS. 33A and 33B are schematics for explaining a disadvantage in performing an auto power control (APC) by using light beams that have passed through the plastic molded scanning lens.
Figure 33B:
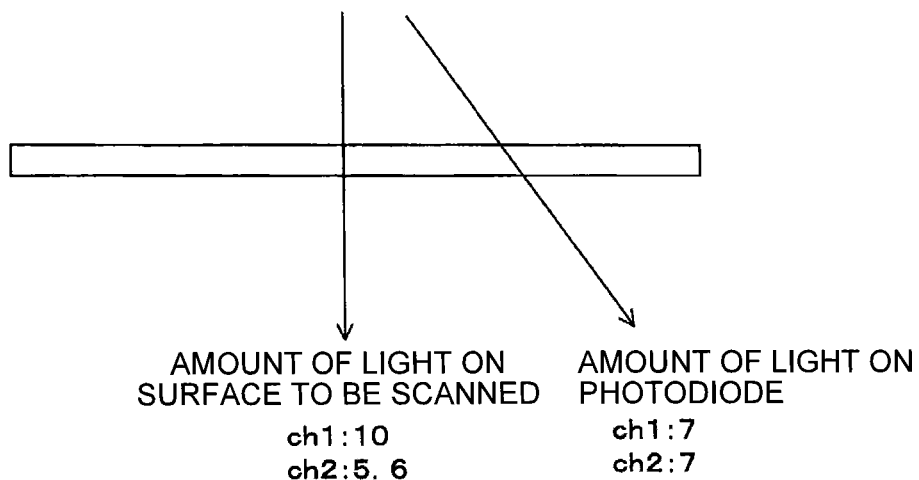

The image forming apparatus may also be a color printer 2000 having a plurality of photosensitive elements as illustrated in FIG. 29.

The color printer 2000 is a tandem-type multi-color printer that forms a full-color image by superimposing four colors (black, cyan, magenta, and yellow) over one another, which includes: a photosensitive element K1, a charging unit K2, a developing unit K4, a cleaning unit K5, and a transfer unit K6 for the color black; a photosensitive element C1, a charging unit C2, a developing unit C4, a cleaning unit C5, and a transfer unit C6 for the color cyan; a photosensitive element M1, a charging unit M2, a developing unit M4, a cleaning unit M5, and a transfer unit M6 for the color magenta; a photosensitive element Y1, a charging unit Y2, a developing unit Y4, a cleaning unit Y5, and a transfer unit Y6 for the color yellow; an optical scanning device 2010; a transfer belt 2080; and a fixing unit 2030.

Each of the photosensitive elements is rotated in the direction indicated by the arrow in FIG. 29, and the charging units, the developing units, the transfer units, and the cleaning units are arranged around the corresponding photosensitive elements, sequentially in the direction of rotation of the photosensitive elements.

Each of the charging units charges the surface of the corresponding photosensitive element uniformly. Each of the surfaces of the photosensitive elements charged by the charging unit is optically scanned by the optical scanning device 2010, and a latent image is formed on each of the photosensitive elements.

The corresponding developing unit forms a toner image on the surface of each of the photosensitive elements. The corresponding transfer unit sequentially transfers the toner image of each color onto a recording sheet on the transfer belt 2080, and the fixing unit 2030 finally fixes the image onto the recording sheet.

The optical scanning device 2010 has the same configuration as any one of the first to the tenth exemplary configurations. Therefore, the same effects as in the optical scanning device 1010 can be achieved.

Hence, the color printer 2000 can achieve the same effects as those achieved by the laser printer 1000.

Furthermore, the optical scanning device may also be provided for each of the colors, or for each of the two colors in the color printer 2000.

According to one aspect of the present invention, highly accurate optical scanning can be performed while using a multi-beam light source and a plastic molded scanning lens.

According to another aspect of the present invention, highly accurate optical scanning can be performed while using a multi-beam light source and a plastic molded scanning lens.

According to still another aspect of the present invention, because the optical scanning device according to the invention is provided, cost can be reduced without compromising image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a light source including a plurality of light-emitting elements;
    a deflector that deflects light beams output from the light source;
    a scanning optical system that condenses the light beams deflected on the deflector onto a surface to be scanned, and includes
        at least one resin scanning lens having a support at an end thereof along a main-scanning direction, and
        at least one folding mirror disposed behind the at least one resin scanning lens;
    a light-receiving element to which part of the light beams, which is deflected on the deflector and passes through the support but not used for scanning the surface, enters via the at least one folding mirror as light-amount monitoring light beams; and
    a controller that controls a driving signal for the light-emitting elements based on an output signal from the light-receiving element.

2. The optical scanning device according to claim 1, wherein
    the light-amount monitoring light beams enter the light-receiving element after having passed through the support.

3. The optical scanning device according to claim 1, wherein the light beams travelling toward the light-receiving element are convergent light having a converging point in front of or behind a light receiving surface of the light-receiving element.

4. The optical scanning device according to claim 1, wherein a plurality of light spots on a light receiving surface of the light-receiving element overlaps each other at least partially when all of the light-emitting elements are turned on.

5. The optical scanning device according to claim 1, wherein spot diameters of the light-amount monitoring light beams on a light receiving surface of the light-receiving element are larger than spot diameters of writing light beams on a surface to be scanned both in a main-scanning corresponding direction and a sub-scanning corresponding direction.

6. The optical scanning device according to claim 1, wherein the scanning optical system includes a glass sheet having at least one surface applied with anti-reflection coating.

7. The optical scanning device according to claim 1, wherein
- the at least one folding mirror and at least one sheet glass are arranged between a resin scanning lens located nearest to the deflector in the scanning optical system and a surface to be scanned,
- a total number of the folding mirror(s) and the glass sheet(s) is an even number, and
- assuming that a light beam including a first ray and a second ray that are separated from each other in a rotating shaft direction are incident, m1+g2=m2+g1 is satisfied for an optical path length of the first ray and the second ray from the deflector, where
- number of the folding mirror(s) with which the first ray has a shorter optical path from the deflector than the second ray is m1,
- number of the folding mirror(s) with which the second ray has a shorter optical path from the deflector than the first ray is m2,
- number of the sheet glass(es) with which the first ray has a shorter optical path from the deflector than the second ray is g1, and
- number of the sheet glass(es) with which the second ray has a shorter optical path from the deflector than the first ray is g2.

8. The optical scanning device according to claim 1, wherein
- the at least one folding mirror and at least one sheet glass are arranged between a resin scanning lens located nearest to the deflector in the scanning optical system and the surface to be scanned,
- a total number of the folding mirror(s) and the glass sheet(s) is an odd number, and
- the at least one sheet glass has a surface coated with anti-reflection coating.

9. The optical scanning device according to claim 1, wherein the light source including the light-emitting elements is a vertical cavity surface emitting laser array.

10. An image forming apparatus comprising:
- at least one image carrier; and
- at least one optical scanning device according to claim 1 that scans the at least one image carrier using light beams modulated based on image information.

* * * * *